United States Patent
Walz et al.

(10) Patent No.: US 7,711,615 B2
(45) Date of Patent: May 4, 2010

(54) METHODS, APPARATUS, SYSTEMS, COMPUTER PROGRAM PRODUCTS AND MEDIUMS FOR USE IN ASSOCIATION WITH ACCOUNTING AND/OR FINANCIAL ANALYSIS

(75) Inventors: Stefan Walz, Sinzheim (DE); Rudolf Gentner, Waghausel (DE); Birgit Ottinger, Schwetzingen (DE); Judith Pistor, Ketsch (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/779,593

(22) Filed: Jul. 18, 2007

(65) Prior Publication Data

US 2009/0024494 A1    Jan. 22, 2009

(51) Int. Cl.
G07B 17/00 (2006.01)
G07F 19/00 (2006.01)

(52) U.S. Cl. ...................................................... 705/30

(58) Field of Classification Search .................. 705/30
See application file for complete search history.

(56) References Cited

U.S. PATENT DOCUMENTS

| | | | | |
|---|---|---|---|---|
| 6,058,375 A | * | 5/2000 | Park ............................ | 705/30 |
| 6,246,999 B1 | * | 6/2001 | Riley et al. ................... | 705/30 |
| 6,668,253 B1 | * | 12/2003 | Thompson et al. ........... | 707/10 |
| 6,687,677 B1 | * | 2/2004 | Barnard et al. ................ | 705/7 |
| 7,131,579 B2 | * | 11/2006 | Kim ........................... | 235/379 |
| 7,149,700 B1 | * | 12/2006 | Munoz et al. ................. | 705/8 |
| 7,213,064 B2 | * | 5/2007 | Smith et a .................. | 709/223 |
| 7,254,554 B2 | * | 8/2007 | Tawara et al. ................ | 705/30 |
| 7,370,244 B2 | * | 5/2008 | Breitling et al. ............... | 714/49 |
| 2004/0044556 A1 | * | 3/2004 | Brady et al. ................... | 705/8 |
| 2006/0085302 A1 | * | 4/2006 | Weiss et al. ................... | 705/30 |
| 2006/0161485 A1 | * | 7/2006 | Meldahl ...................... | 705/35 |

FOREIGN PATENT DOCUMENTS

AT    1 677 241 EP    7/2006

OTHER PUBLICATIONS

Russell Shaw. (1998). ABC and ERP: Partners at last? Management Accounting, 80(5), 56-58. Retrieved Nov. 10, 2009, from ABI/INFORM Global. (Document ID: 36164615).*

Mark E Plemmons. (2003). Implementing complex costing models for schedules. AACE International Transactions,IT21-IT23. Retrieved Nov. 10, 2009, from ABI/INFORM Global. (Document ID: 423234201).*

Gunther Rothermel and Elvira Wallis, "Being Event-driven", SAP Netweaver Production Definition [Oneline] Mar. 14, 2006, XP00254460, Retrieved from the Internet: URL:http://complexevents.com/slides/SAP.pdf, [Retrieved on Sep. 11, 2009], 10pgs.

European Search Report, mailed Feb. 10, 2009 for European Application No. 09 008 271.0, 7pgs.

* cited by examiner

*Primary Examiner*—Matthew S Gart
*Assistant Examiner*—Harshad Parikh
(74) *Attorney, Agent, or Firm*—Buckley, Maschoff & Talwalker LLC

(57) ABSTRACT

In some embodiments, a method includes: generating entries for at least one cost plan, each of the entries including a planned amount and a descriptor, wherein the descriptor identifies a general ledger account. In some embodiments, a method includes: generating postings for at least one ledger, each of the postings including an actual amount, a first descriptor and a second descriptor, wherein the first descriptor identifies a general ledger account and wherein the second descriptor identifies a general ledger account.

30 Claims, 28 Drawing Sheets

ASSETS

Current Assets
Cash and cash equivalents    12
Accounts receivable
Inventories (Work in Process (WIP), etc.)
Prepaid Expenses
Investments held for trading
Other current assets

Fixed Assets (Non-Current Assets)
Property, plant and equipment
Less: Accumulated Depreciation
Goodwill
Other intangible fixed assets
Investments in associates
Deferred tax assets

LIABILITIES and EQUITY

Current liabilities
Accounts payable
Current income tax liabilities
Current portion of bank loans payable
Short-term provisions
Other current liabilities

Long term Liabilities (Fixed Liabilities)
Bank loans
Issued debt securities
Deferred tax liability
Provisions
Minority interest

Equity
Share capital
Capital reserves
Revaluation reserve
Translation reserve
Retained earnings

PRIOR ART

FIG. 1A

| Cost Line Item Type | | Amount | Cost Revenue Element |
|---|---|---|---|
| Material | Material A | $600 | 510001 Consumption Noble Metal |
| Material | Material B | $300 | 510001 Consumption Noble Metal |
| Material | Material C | $200 | 510005 Consumption Raw Material |
| Service | Service A | $400 | 550000 "Labor hours" |
| Overhead | Material | $95 | 580001 Material Overheads |
| Overhead | Service | $150 | 580002 Service Overheads |
| Material | Product | -$1500 | 519000 Products |

| Business Transaction Type | | Amount | GL Account | Cost Revenue Element | Cost Object |
|---|---|---|---|---|---|
| 344 Goods Issue For Production | Material A | $700 | 121000 „WIP Production" | 510001 Consumption Noble Metal | Prod Lot 600300 |
| 344 Goods Issue For Production | Material B | $300 | 121000 „WIP Production" | 510001 Consumption Noble Metal | Prod Lot 600300 |
| 344 Goods Issue For Production | Material C | $200 | 121000 „WIP Production" | 510005 Consumption Raw Materia | Prod Lot 600300 |
| 403 Internal Service Consumption | Service A | $300 | 121000 „WIP Production" | 550000 „Labor hours" | Prod Lot 600300 |
| Overhead | Material | $100 | 121000 „WIP Production" | 580001 Material Overheads | Prod Lot 600300 |
| Overhead | Service | $150 | 121000 „WIP Production" | 580002 Service Overheads | Prod Lot 600300 |
| 303 Goods Receipt from Production | Product | -$1500 | 121000 „WIP Production" | 519000 Products | Prod Lot 600300 |
| WIP Clearing | | $250 | 121000 „WIP Production" | 519000 Products | Prod Lot 600300 |

| Cost Revenue Element | Plan Amount | Actual Amount | Variance Amount |
|---|---|---|---|
| 510001 Consumption Noble Metal | $900 | $1000 | -$100 |
| 510005 Consumption Raw Metal | $200 | $200 | $0 |
| 550000 „Labor hours" | $400 | $300 | $100 |
| 580001 Material Overheads | $95 | $100 | -$5 |
| 580002 Service Overheads | $150 | $150 | $0 |
| 519000 Products | -$1500 | -$1250 | -$250 |

FIG. 9A

| Cost Revenue Element | Plan Amount |
|---|---|
| 510001 Consumption Noble Metal | $900 |
| 510005 Consumption Raw Metal | $200 |
| 550000 „Labor hours" | $400 |
| 580001 Material Overheads | $95 |
| 580002 Service Overheads | $150 |
| 519000 Products | -$1500 |

| Cost Revenue Element | Actual Amount |
|---|---|
| 510001 Consumption Noble Metal | $1000 |
| 510005 Consumption Raw Metal | $200 |
| 550000 „Labor hours" | $300 |
| 580001 Material Overheads | $100 |
| 580002 Service Overheads | $150 |
| 519000 Products | -$1250 |

FIG. 9C

Company: ULJav, Inc. — 1306  
Document Number: 12000000586 — 1308  
Document Type: CINV — 1310  
Original Entry Document Type: Goods Issue — 1312  
Original Entry Document Number: 5557389574 — 1314

Document Date: 04/01/2007 — 1316  
Posting Date: 04/01/2007 — 1318  
Accounting Period: 04/2007 — 1320  
Transaction Currency: USD — 1322  
Currency Conversion Date: 04/01/2007 — 1324

| Line | Account Type | cost object | GL Account | CRE | Debit / Credit | Amount in Trans.Curr. |
|---|---|---|---|---|---|---|
| 001 | WIP | prod.lot 600300 | 121000 | 5100005 | D | USD 200.00 |
| 002 | Stock | | 300000 | | C | USD 200.00 |

FIG. 13

Company: ULJav, Inc.   Document Date: 04/01/2007
Document Number: 1200000587   Posting Date: 04/01/2007
                              Accounting Period: 04/2007
Document Type: CINV
Original Entry Document Type: Consumption   Transaction Currency: USD
Original Entry Document Number: 5557389574   Currency Conversion Date: 04/01/2007

| Line | Account Type | cost object | GL Account | CRE | Debit / Credit | Amount in Trans.Curr. |
|------|--------------|-------------|------------|--------|----------------|----------------------|
| 001  | WIP          | prod.lot 600300 | 121000 | 550000 | D              | USD 300.00           |
| 002  | Overhead     |             | 550000     |        | C              | USD 300.00           |

| Allowed values for Cost Revenue Element |
|---|
| 510001 "Consumption Noble Metal" |
| 510005 "Consumption Raw Material" |
| 550000 "Labor Hours" |
| 580001 "Material Overheads" |
| 580002 "Service Overheads" |
| 519000 "Products" |

FIG. 24

| Allowed values for Cost Revenue Element |
|---|
| 510005 "Consumption Material" |
| 550000 "Labor Hours" |
| 580001 "Overheads" |
| 519000 "Products" |

FIG. 25

| Cost Revenue Element | Amount Plan | Amount Actual | Variance |
|---|---|---|---|
| 510005 "Consumption Raw Material" | $ 1100 | $ 1200 | $ -100 |
| 550000 "Labor Hours" | $ 400 | $ 300 | $ 100 |
| 580001 "Material Overheads" | $ 245 | $ 250 | $ -5 |
| 519000 "Products" | $ -1500 | $ -1250 | $ -250 |

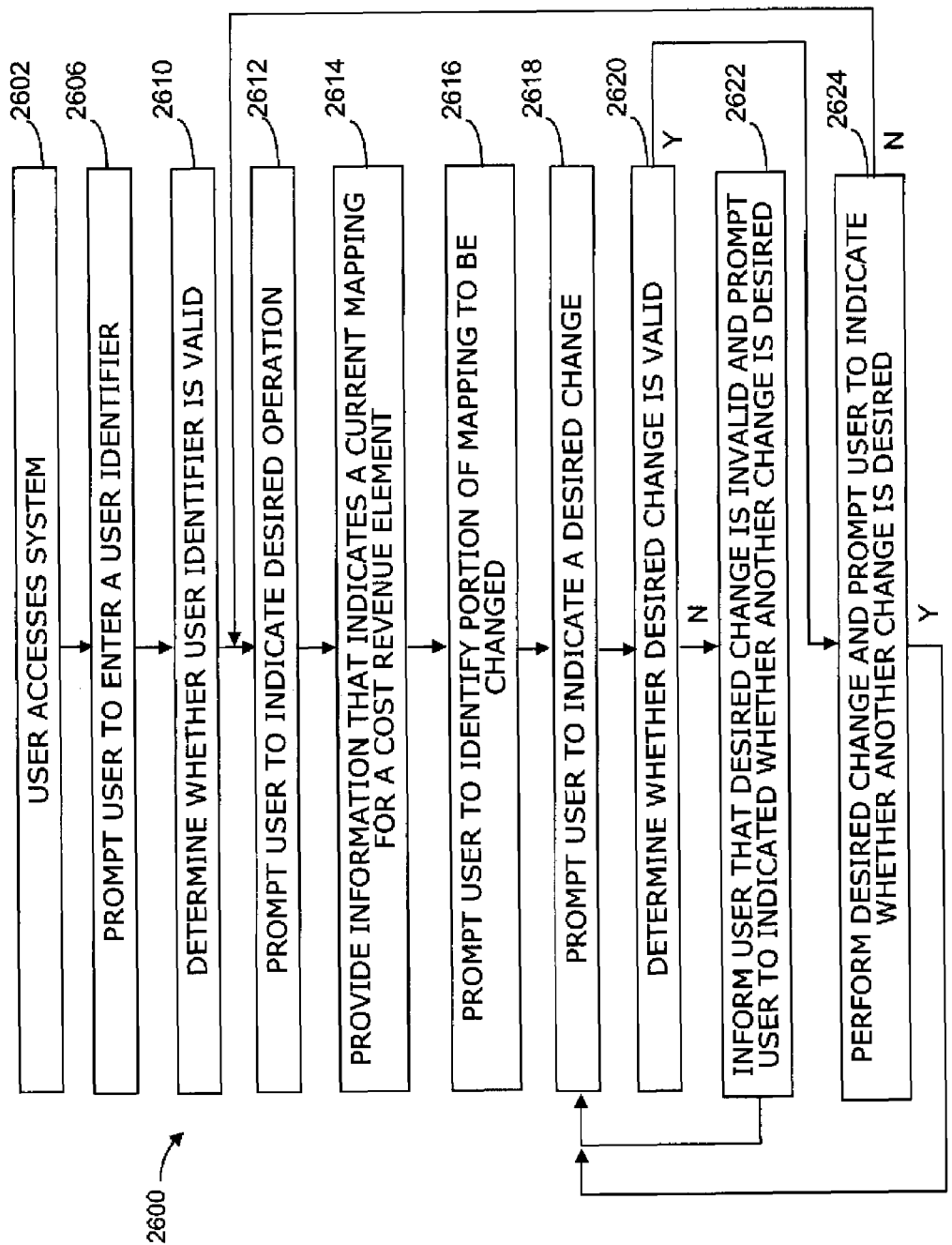

METHODS, APPARATUS, SYSTEMS, COMPUTER PROGRAM PRODUCTS AND MEDIUMS FOR USE IN ASSOCIATION WITH ACCOUNTING AND/OR FINANCIAL ANALYSIS

FIELD

Some embodiments disclosed herein relate to methods, apparatus, systems, computer program products and/or mediums for use in association with accounting and/or financial analysis.

BACKGROUND

A balance sheet is one type of financial statement that may be generated for a business. Some regulatory authorities require that a business generate a balance at least once per year. The regulatory authorities may also require that the balance sheet have a specific structure and/or specific accounts, sometimes referred to as balance sheet accounts. Examples of balance sheet accounts include, but are not limited to assets, liabilities, depreciation, etc. FIG. 1A is a schematic representation of a structure for a simple balance sheet 10. Some regulatory authorities may also assign a number and/or code to one or more of the required balance sheet accounts.

In a cost of sales method of accounting, direct costs attributed to the production of goods and/or services sold by a business are assigned to one or more balance sheet accounts. For example, direct costs associated with materials that have begun transformation to finished goods are assigned to a work in process (WIP) account 12 (FIG. 1A), which may be part of inventories in the assets portion of the balance sheet. Examples of goods and/or services that may be sold by a business include, but are not limited to, washing machines, cars and buildings. Notably, the goods and/or services that are sold by a business are sometimes referred to as cost objects. Manufacturing orders, sales orders, service orders and/or projects relating to goods and/or services are also sometimes referred to as cost objects.

Some businesses find that actual costs attributed to the production of goods and/or services may differ from planned costs for production of such goods and/or services. The difference between an actual cost and a planned cost is sometimes referred to as a variance.

Some businesses perform cost analysis to identify and/or help identify reason(s) for variances and implement changes to try to address such variances. For example, some businesses may make changes in regard to its choice of suppliers and/or processes used within the business. In some situations, the business may decide to change the selling price of the goods and/or services.

Various products are available to assist businesses in regard to accounting and/or cost analysis. Examples of such products include SAP-BW, and SAP-ERP component CO-PC, produced by SAP AG.

Notwithstanding the availability of such products, additional methods, apparatus, systems, computer program products and/or mediums to further assist in accounting and/or financial analysis are desired.

BRIEF DESCRIPTION OF THE DRAWINGS

FIG. 1A is a schematic representation of a structure for a simple balance sheet.

FIG. 5 is a schematic representation of a cost plan that may be generated by the financial system of the system of FIG. 1B, in accordance with some embodiments.

FIG. 8 is a schematic representation of information that may be generated by the financial system of the system of FIG. 1B, in accordance with some embodiments.

FIG. 9A is a schematic representation of a report that may be generated by the financial system of the system of FIG. 1B, in accordance with some embodiments.

FIG. 9B is a schematic representation of a report that may be generated by the financial system of the system of FIG. 1B, in accordance with some embodiments.

FIG. 9C is a schematic representation of a report that may be generated by the financial system of the system of FIG. 1B, in accordance with some embodiments.

FIG. 13 is a schematic representation of information that may be generated by the financial system of the system of FIG. 1B, in accordance with some embodiments.

FIG. 14 is a schematic representation of information that may be generated by the financial system of the system of FIG. 1B, in accordance with some embodiments.

FIG. 23 is schematic representation of cost revenue elements that may be provided in accordance with some embodiments.

FIG. 24 is schematic representation of cost revenue elements that may be provided in another embodiment.

FIG. 25 is a schematic representation of a report that may be generated by the financial system of the system of FIG. 1B, in accordance with some embodiments.

FIG. 26 is a flow chart of a method according to some embodiments.

DETAILED DESCRIPTION

In some embodiments, methods may comprise: (i) generating entries for at least one cost plan, wherein each of the entries include a planned amount and a descriptor, wherein the descriptor identifies a general ledger account and/or (ii) generating postings for at least one ledger, each of the postings including an actual amount, a first descriptor and a second descriptor, wherein the first descriptor identifies a general ledger account and wherein the second descriptor identifies a general ledger account. In some embodiments, apparatus may comprise a processing system and/or a processor to (i) generate entries for at least one cost plan, each of the entries including a planned amount and a generate entries for at least one cost plan, each of the entries including a planned amount and a descriptor, wherein the descriptor identifies a general ledger account and/or (ii) generate postings for at least one ledger, each of the postings including an actual amount, a first descriptor and a second descriptor, wherein the first descriptor identifies a general ledger account and wherein the second descriptor identifies a general ledger account. In some embodiments, computer program products and/or storage mediums may comprise instructions that if executed by a machine result in: (i) generating entries for at least one cost plan, wherein each of the entries include a planned amount and a descriptor, wherein the descriptor identifies a general ledger account and/or (ii) generating postings for at least one ledger, each of the postings including an actual amount, a first descriptor and a second descriptor, wherein the first descriptor identifies a general ledger account and wherein the second descriptor identifies a general ledger account.

Figure 1B:
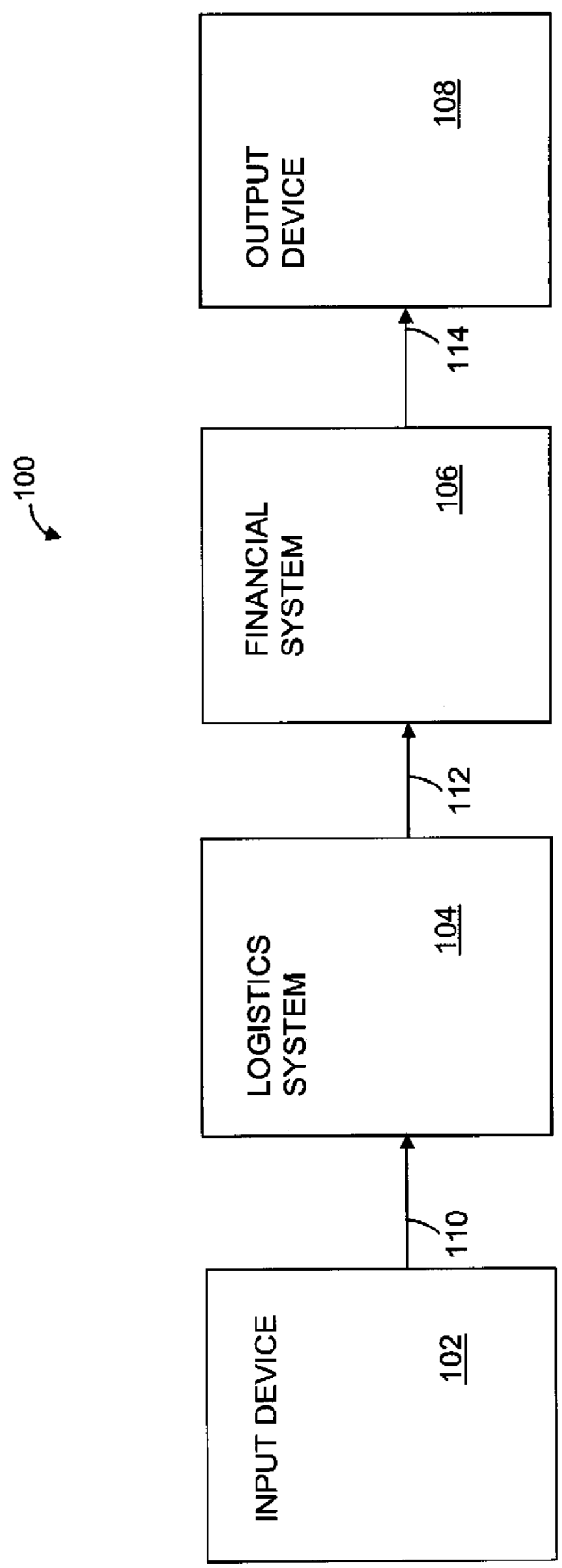
FIG. 1B is a functional block diagram of a system in accordance with some embodiments.

FIG. 1B is a functional block diagram of a processing system 100 in accordance with some embodiments. In some embodiments, the processing system 100 may be used be in the course of operation of a business. Referring to FIG. 1B, in accordance with some embodiments, the processing system 100 includes an input device 102, a logistic system 104, a financial system 106 and an output device 108.

The input device 102 may be coupled to the logistic system 104 by a first communication link 110. The logistic system 104 may be coupled to the financial system 106 by a second communication link 112. The financial system 106 may be coupled to the output device 108 through a third communication link 114.

In operation, the input device 102 may supply information to the logistic system 104, for example, via the first communication link 110. The logistic system 104 may receive the information provided by the input device 102 and may store information and/or provide information that may be supplied to the financial system 106, for example, via the second communication link 112. The financial system 104 may receive the information provided by the logistic system and may store information and/or provide information that may be supplied to an output device 108, for example, via the third communication link 114. In some embodiments, output device 108 may comprise a display device.

A communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

In some embodiments, one or more portions of the processing system 100 may be used without one or more other portions of the processing system 100. In some embodiments, the processing system 100 (or portion(s) thereof) may be used in association with one or more other systems or portion(s) thereof.

In some embodiments, the processing system 100 may comprise one or more processors. As used herein, a processor may be any type of processor. For example, a processor may be programmable or non programmable, general purpose or special purpose, dedicated or non dedicated, distributed or non distributed, shared or not shared, and/or any combination thereof. If the processor has two or more distributed portions, the two or more portions may communicate with one another through a communication link. A processor may include, for example, but is not limited to, hardware, software, firmware, hardwired circuits and/or any combination thereof.

Figure 2:
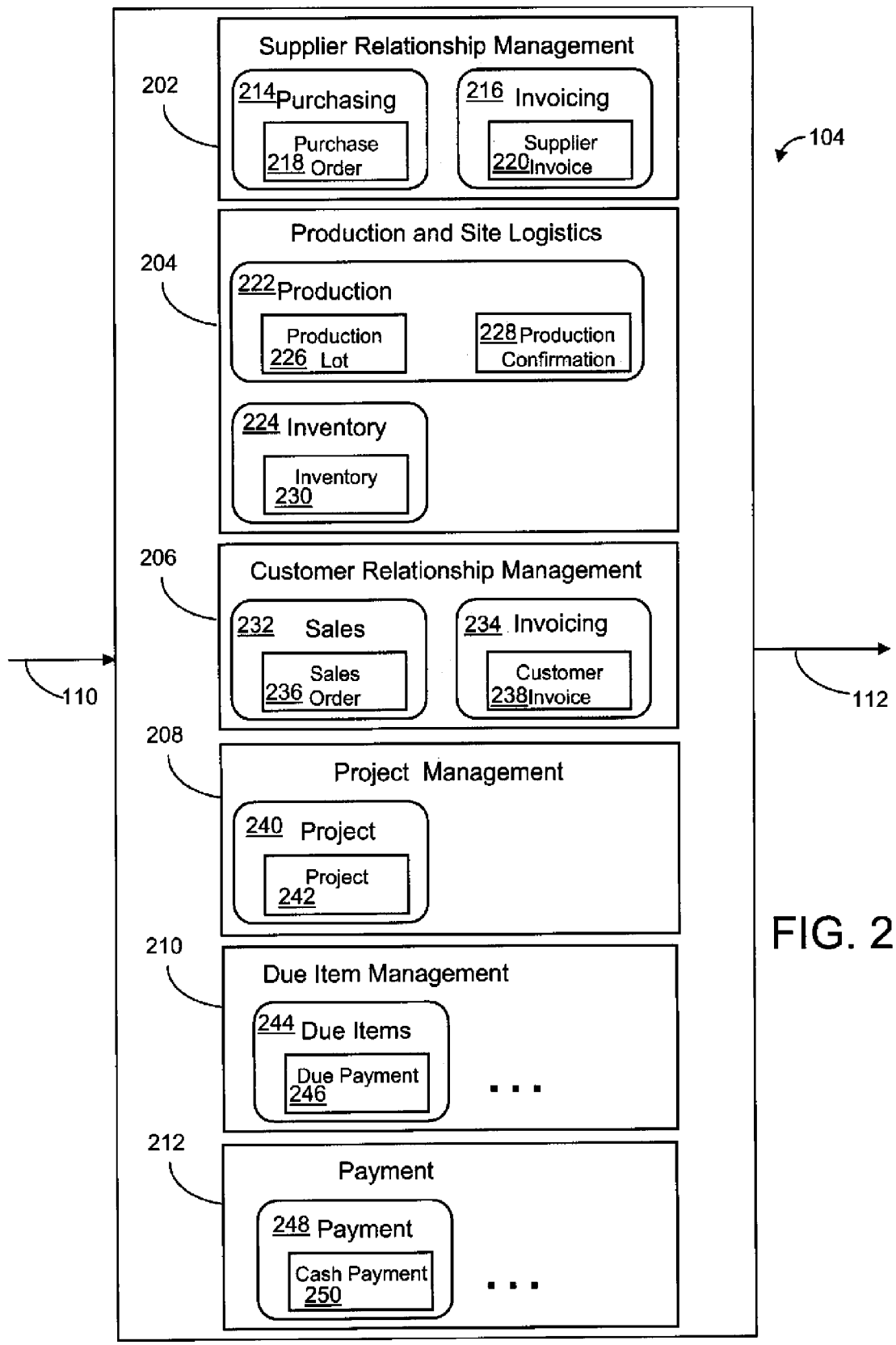
FIG. 2 is a functional block diagram of a logistics system of the system of FIG. 1B, in accordance with some embodiments.

FIG. 2 is a functional block diagram of a portion of the logistic system 104 in accordance with some embodiments. Referring to FIG. 2, in accordance with some embodiments, the logistic system 104 may include a supplier relationship management portion 202, a production and site logistics portion 204, a customer relationship management portion 206, a project management portion 208, a due item management portion 210 and a payment portion 212.

The supplier relationship management portion 202 may include a purchasing portion 214 and an invoicing portion 216. The purchasing portion may include data indicative of one or more purchase orders 218. The invoicing portion 216 may include data indicative of one or more supplier invoices 220.

The production and site logistics portion 204 may include a production portion 222 and an inventory portion 224. The production portion 222 may include data indicative of one or more production lots 226 and data indicative of one or more production confirmations 228. The inventory portion 224 may include data indicative of one or more inventory 230.

The customer relationship management portion 206 may include a sales portion 232 and an invoicing portion 234. The sales portion 232 may include data indicative of one or more sales orders 236. The invoicing portion 234 may include data indicative of one or more customer invoices 238.

The project management portion 208 may include a project portion 240, which may include data indicative of one or more projects 242.

The due item management portion 210 may include a due item portion 244, which may include data indicative of one or more due payments 246.

The payment portion 212 may include a payment portion 248, which may include data indicative of one or more cash payments 250.

Figure 3:
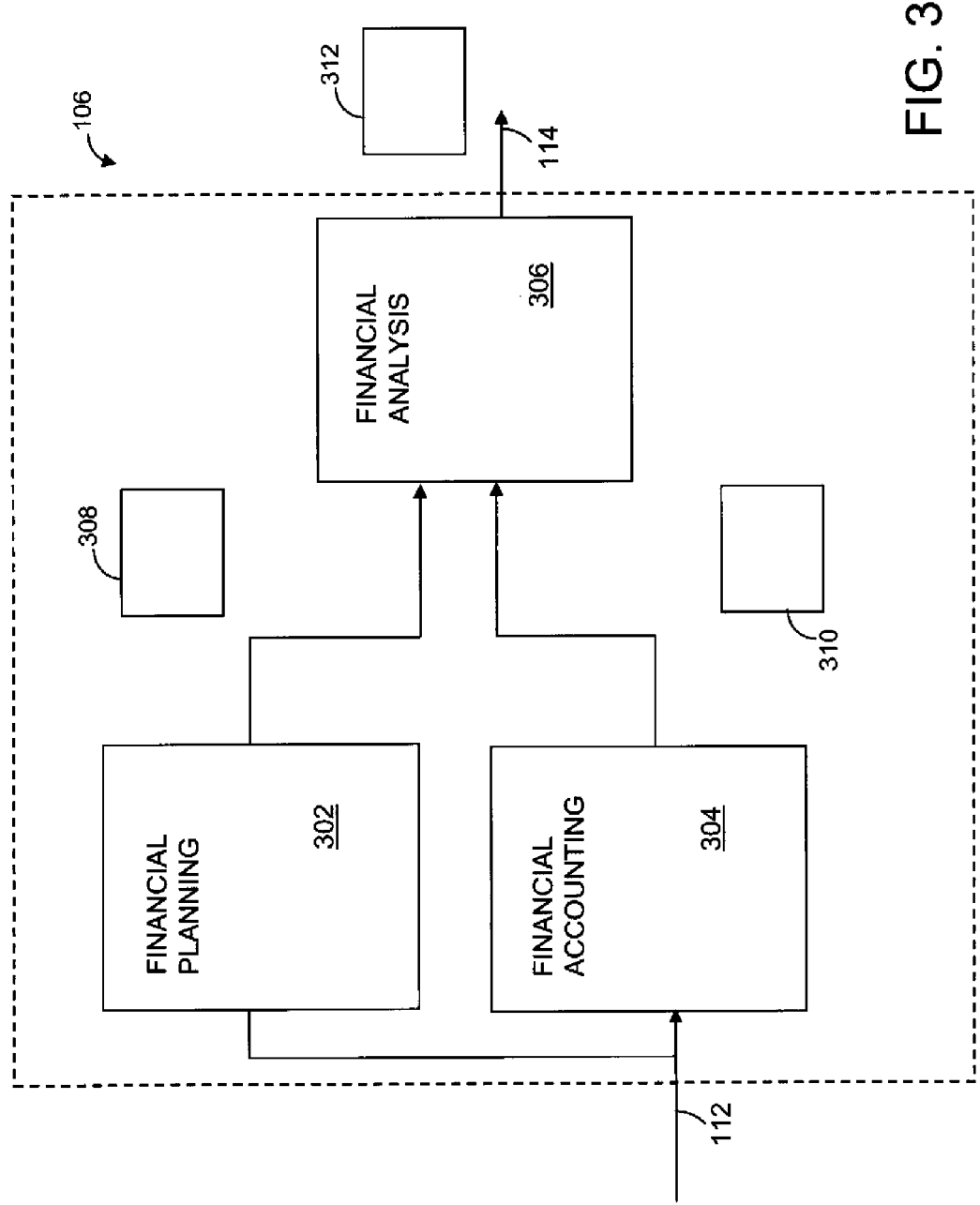
FIG. 3 is a functional block diagram of a financial system of the system of FIG. 1B, in accordance with some embodiments.

FIG. 3 is a functional block diagram of a portion of the financial system 106, in accordance with some embodiments. Referring to FIG. 3, in accordance with some embodiments, the financial system 106 may comprise a financial planning portion 302, a financial accounting portion 304 and a financial analysis portion 306.

The financial planning portion 302 may receive information indicative of materials and/or operations used in a process. A process may include a production process and/or any other type of process or portion thereof. Operations may include but need not be limited to operations that require labor. In some embodiments, the information defines a complete bill of materials and/or bill of operations used in the process. The information may be supplied by the logistics system 104 (FIG. 1B) and/or or any other source(s) of information.

The financial planning portion 302 may generate a cost plan 308 for the process based at least in part on the received data. In some embodiments, the cost plan 308 may include planned amounts (costs and/or planned credits) for each material and/or operation used in the process.

In some embodiments, the cost plan may comprise a cost plan for just one cost object. In some other embodiments, the cost plan may comprise a cost plan for more than one cost object. As stated above, the goods and/or services that are sold by a business are sometimes referred to as cost objects. Manufacturing orders, sales orders, service orders and/or projects relating to goods and/or services are also sometimes referred to as cost objects.

In accordance with some embodiments, a cost plan may be carried out before, during and/or after a process has been carried out, sometimes referred to as a preliminary cost plan, a concurrent cost plan and/or a final cost plan.

The financial accounting portion 304 of the financial system 106 may also receive information relating to the process. The information received by the financial accounting portion 304 may be supplied by the logistics system 104 (FIG. 1B) and/or or any other source(s) of information.

The financial accounting portion 304 may generate accounting information 310 for the process based at least in part on the received information. In some embodiment, the accounting information 310 generated by the financial accounting portion 304 may include actual amounts (costs and/or actual credits) for each material and/or operation used in the process. In accordance with some embodiments, the cost plan 308 and the accounting information 310 may each have any form. In some embodiments, the accounting information may comprise postings for one or more ledgers that use a cost of sales method of accounting. In some embodiments, the accounting information 310 may comprise postings for a general ledger.

The cost plan 308 and the accounting information 310 may each be supplied to the financial analysis portion 306 of the financial system 106, which may generate a report 312 based at least in part thereon. In accordance with some embodiments, the report 312 may include a comparison of one or more planned amounts and one or more actual amounts.

In some embodiments, the report 312 may include a comparison of one or more planned amounts and one or more actual amounts for only one cost object. In some other embodiments, the report 312 may include a comparison of one or more planned amounts and one or more actual amounts for more than one cost object. As stated above, the goods and/or services that are sold by a business are sometimes referred to as cost objects. Manufacturing orders, sales orders, service orders and/or projects relating to goods and/or services are also sometimes referred to as cost objects.

The cost plan 308 may be stored in one or more locations. In some embodiments, one or more portions of the cost plan 308 may be stored in one or more locations and one or more other portions of the cost plan 308 may be stored in one or more other locations.

The accounting information 310 may be stored in one or more locations. In some embodiments, one or more portions of the accounting information 310 may be stored in one or more locations and one or more other portions of the accounting information may be stored in one or more other locations.

Figure 22:
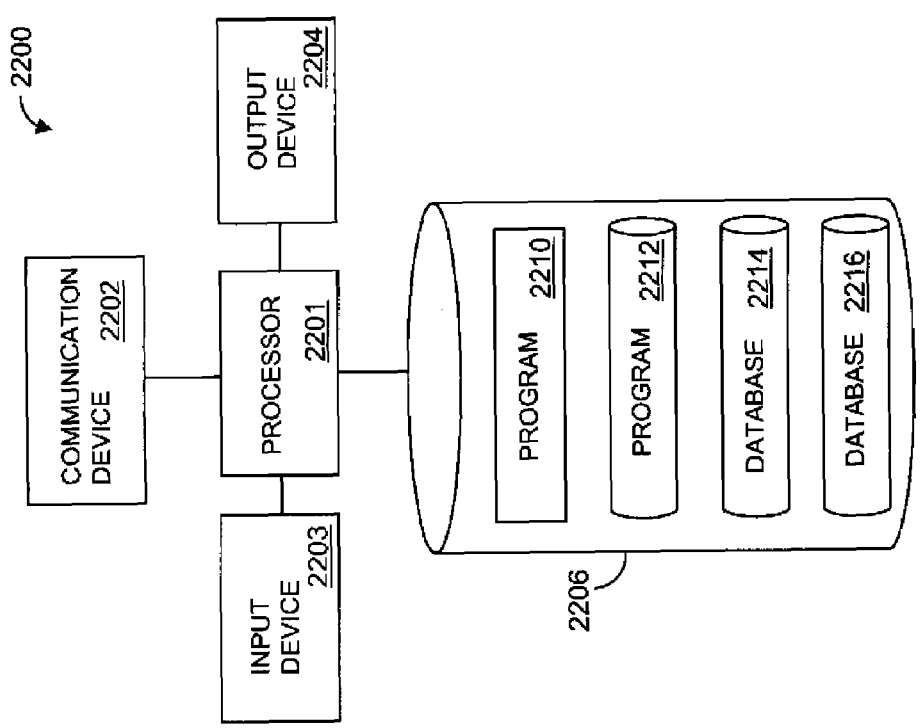
FIG. 22 is a functional block diagram of an apparatus, in accordance with some embodiments.

In some embodiments, one or more of the cost plan 308, the accounting information 310 and the report 312 may be supplied to one or more databases (e.g., one or more of databases 2214-2216 (FIG. 22).

In some embodiments, one or more of the cost plan 308, the accounting information 310 and the report 312 may be displayed via a user interface. In some embodiments, a user interface may comprise a graphical user interface. In some embodiments, a user interface may include a personal computer that executes a browser program, receives signals from one or more input devices, for example, a mouse and/or keyboard, supplies signals to one or more output devices, for example, a display.

In some embodiments, one or more of the financial planning portion 302, the financial accounting portion 304 and/or the financial analysis portion 306 may comprise one or more look up tables and/or other mapping that defines an association between material(s) and/or operation(s) and planned costs for such material(s) and/or operations.

In accordance with some embodiments, a mapping may have any form, for example, but not limited to, a look-up table, a rule base, hardwired logic, fuzzy logic, neural networks, and/or any combination thereof. Moreover, a mapping may be embodied, for example, in software, hardware, firmware or any combination thereof.

In accordance with some embodiments, a mapping may be based at least in part on one or more input/output combinations. In some embodiments, each input/output combination may include an input and an output associated therewith.

In accordance with some embodiments, a mapping may be generated manually and/or automatically and may be generated during development and/or operation of the financial system.

In some embodiments, one or more portions of the financial system 106 may be used without one or more other portions of the financial system 106. In some embodiments, the financial system 106 (or portion(s) thereof) may be used in association with one or more other systems or portion(s) thereof.

Figure 4:
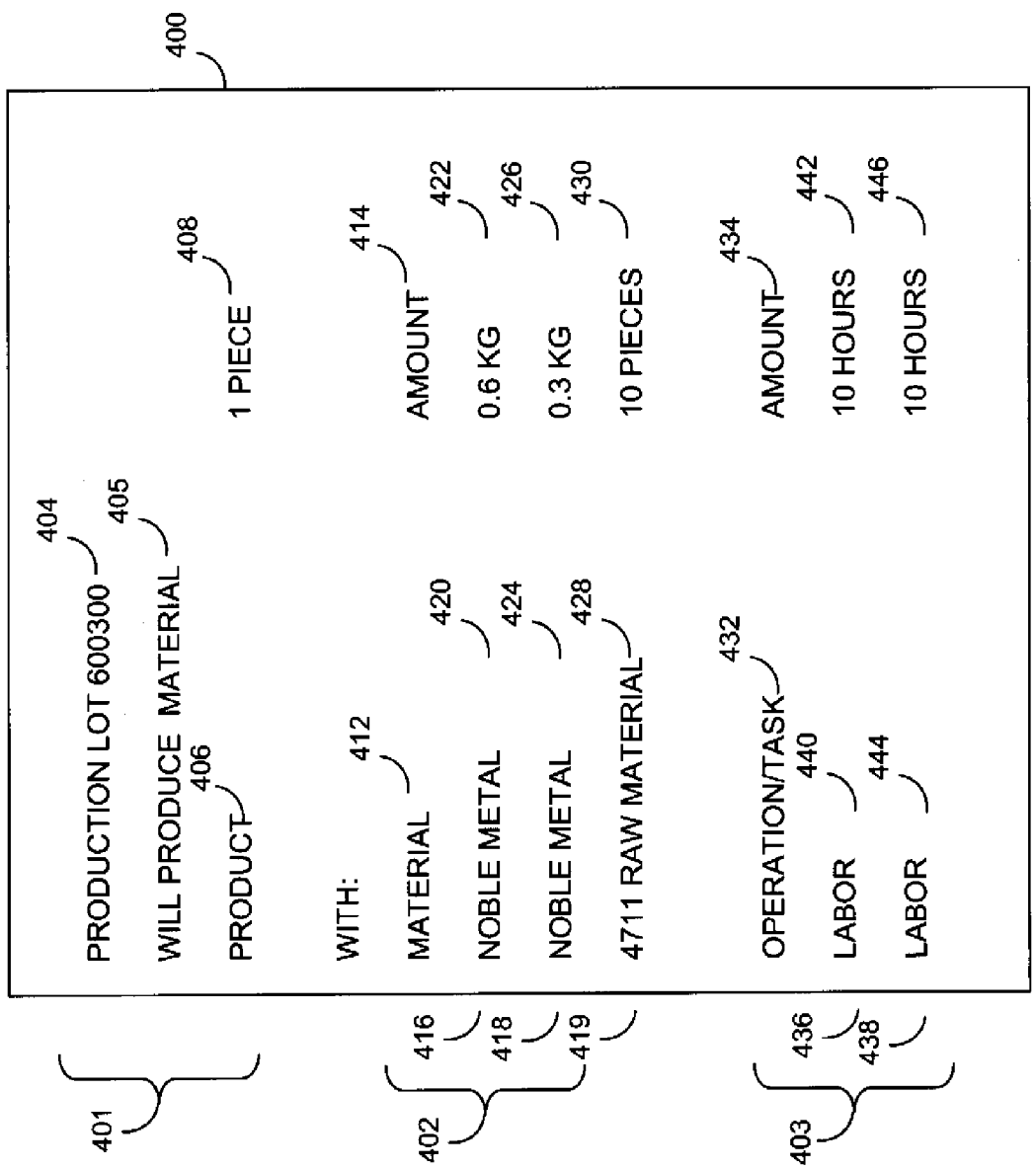
FIG. 4 is a schematic representation of information that may be supplied to the financial system of the system of FIG. 1B, in accordance with some embodiments.

FIG. 4 is a schematic representation of information 400 that may be supplied to the financial planning portion 302 (FIG. 3) in accordance with some embodiments. Referring to FIG. 4, in accordance with some embodiments, the information 400 may comprise a header 401, a bill of materials 402 and a bill of operations 403. The header 401 may include one or more portions. For example, a first portion 404 may indicate the type of process, e.g., production lot 600300. If the process is a production lot, a second portion 405 may indicate that the production lot will produce a material and a third portion 406 may indicate a name of such material, e.g., product. A fourth portion 408 may indicate a quantity to be produced, e.g., 1 piece.

The bill of materials 402 may include a header and a body. The header may include one or more portions, each of which may define one or more columns. A portion 912 may define a column for a material. A portion 414 may define a column for an amount. The body may include a plurality of rows or entries, e.g., entries 416-419, each of which may indicate a type of material and/or a quantity of such material used in the process.

For example, the first entry 416 may include a portion 420 that indicates a type of material used, e.g., noble metal, and a portion 422 that indicates an amount of such material, e.g., 0.6 kilograms (kg). The second entry 418 may include a portion 424 that indicates a type of material used, e.g., noble metal, and a portion 426 that indicates an amount of such material, e.g., 0.3 kilograms (kg). The third entry 419 may include a portion 428 that indicates a type of material used, e.g., 4711 raw material, and a portion 430 that indicates an amount of such material, e.g., 10 pieces.

In some embodiments, the bill of materials may include an entry for each material used in a process.

The bill of operations 403 may also include a header and a body. The header may include one or more portions, each of which may define one or more columns. For example, a portion 432 may define an operation/task column. A portion 434 may define an amount column. The body may include a plurality of rows or entries, e.g., entries 436-438, each of which may indicate a type of operation and/or quantity of such operation used in the process.

For example, the first entry 436 may include a portion 440 that indicates a type of operation, e.g., labor, and a portion 442 that indicates an amount of such operation, e.g., 10 hours, used in the process. The second entry 438 may include a portion 444 that indicates a type of operation, e.g., labor, and a portion 446 that indicates an amount of such operation, e.g., 10 hours, used in the process. In some embodiments, the bill of operations may include an entry for each operation used in the process.

FIG. 5 is a schematic representation of a cost plan 308 that may be generated by the financial planning portion 302 (FIG. 3), in accordance with some embodiments. Referring to FIG. 5, in accordance with some embodiments, the cost plan 308 may define a table having a header 502 and a body 503.

The header 502 may include one or more portions, each of which may include one or more fields and/or may define one or more columns. A first portion 504 may define a column for a cost line item type, further described hereinafter. A second portion 505 may define a column for information that indicates a type of material used in the process, a type of operation used in the process, a type of overhead and/or a type of material produced by the process, etc. Such information is sometimes referred to herein as a material/operation/overhead type. A third portion 506 may define a column for an amount. The amount may define a planned amount (cost and/or credit) for such material used in the process, such operation used in the process, such overhead and/or such material produced by the process, etc. A fourth portion 508 may define a column for a descriptor, sometimes referred to herein as a cost revenue element. In accordance with some embodiments, the cost revenue element may be used in associating one or more planned amounts (costs and/or credits) of the cost plan 308 and/or one or more actual amounts (costs and/or credits) of the accounting information 310. The cost revenue element may comprise one or more numeric, one or more values, one or more strings, one or more descriptions, one or more codes and/or any other type of information.

The body 503 may include a plurality of rows or entries, e.g., entries 510-522, each of which may include one or more portions. In accordance with some embodiments, each entry may be associated with a planned amount (cost and/or credit) of the cost plan 308. As stated above, the cost plan may include planned amounts (costs and/or credits) for each of such materials and/or operations.

In some embodiments, each entry may include four portions, i.e., a cost line item type, a material/operation/overhead type, an amount and a cost revenue element. The cost line item type may indicate whether the entry is associated with (i) a material used in the process, (ii) an operation used in the process, (iii) overhead and/or (iv) material produced by the process, etc. In accordance with some embodiments, the cost line item types may depend on the whether the entry is associated with a material, an operation, etc. and a mapping defined by the financial planning portion 302. In some embodiments, such mapping may be predefined. For example, if the entry is associated with a material, the cost line item type may be material. If the entry is associated with an operation, the cost line item type may be service. The material/operation/overhead type may indicate the material used in the process, the operation used in the process, the overhead and/or the material produced by the process, etc. The amount may define a planned amount (cost and/or credit) for such material used in the process, such operation used in the process, such overhead and/or such material produced by the process, etc. The cost revenue element may be used in associating the planned amount (cost and/or credit) of the entry with one or more other planned amounts (costs and/or credits) of the cost plan 308 and/or one or more actual amounts (costs and/or credits) of the accounting information 310. In some embodiments, such cost revenue element may be determined based at least in part on the cost line item type and the material/operation/overhead type.

In some embodiments, the descriptor or cost revenue element may have a form that may identify a GL account. In some embodiments, the descriptor or cost revenue element may include a numeric portion, e.g., 510001, and a description portion, e.g., consumption noble metal. In some embodiments, the numeric portion may identify the GL account and the description portion may also identify the GL account (i.e., the same GL account as identified by the numeric portion). In some embodiments, the description portion may be descriptive, but may not, by itself, be descriptive enough to identify the GL account (i.e., the GL account identified by the numeric portion). In some embodiments, the descriptive portion may comprise a non numeric portion.

For example, a first entry 510 may include a first portion 530 that indicates a cost line item type, e.g., material, a second portion 532 that indicates a type of a material, e.g., material A, a third portion 534 that indicates a plan amount for such material, e.g., $600, and a fourth portion 538 that indicates a cost revenue element for the entry, e.g., 510001 consumption noble metal.

A second entry 512 may include a first portion 540 that indicates a cost line item type, e.g., material, a second portion 542 that indicates a type of a material, e.g., material B, a third portion 544 that indicates a plan amount for such material, e.g., $300, and a fourth portion 548 that indicates a cost revenue element for the entry, e.g., 510001 consumption noble metal.

A third entry 514 may include a first portion 550 that indicates a cost line item type, e.g., e.g., material, a second portion 552 that indicates a type of a material, material C, a third portion 554 that indicates a plan amount for such material, e.g., $200, and a fourth portion 558 that indicates a cost revenue element for the entry, e.g., 510005 consumption raw material.

A fourth entry 516 may include a first portion 560 that indicates a cost line item type, e.g., service, a second portion 562 that indicates a type of a service, e.g., service A, a third portion 564 that indicates a plan amount for such service, e.g., $400, and a fourth portion 568 that indicates a cost revenue element for the entry, e.g., 550000 labor hours.

A fifth entry 518 may include a first portion 570 that indicates a cost line item type, e.g., overhead, a second portion 572 that indicates a type of overhead, e.g., overhead material, a third portion 574 that indicates a plan amount for such overhead, e.g., $95, and a fourth portion 578 that indicates a cost revenue element for the entry, e.g., 580001 material overheads.

A sixth entry 520 may include a first portion 580 that indicates a cost line item type, e.g., overhead, a second portion 582 that indicates a type of overhead, e.g., overhead service, a third portion 584 that indicates a plan amount for such overhead, e.g., $150, and a fourth portion 588 that indicates a cost revenue element for the entry, e.g., 580002 service overheads.

A seventh entry 522 may include a first portion 590 that indicates a cost line item type, e.g., material, a second portion 592 that indicates a type of material, e.g., product, a third portion 594 that indicates a plan amount for such material, e.g., –$1500, a fourth portion 598 that indicates a cost revenue element for the entry, e.g., 519000 products.

In some embodiments, the cost plan may comprise a cost plan for just one cost object. In some other embodiments, the cost plan may comprise a cost plan for more than one cost object. As stated above, the goods and/or services that are sold by a business are sometimes referred to as cost objects. Manufacturing orders, sales orders, service orders and/or projects relating to goods and/or services are also sometimes referred to as cost objects.

Although the cost plan 308 is shown having a header and columns, the cost plan 308 may have any form and may or may not have headers and/or columns.

Figure 6:
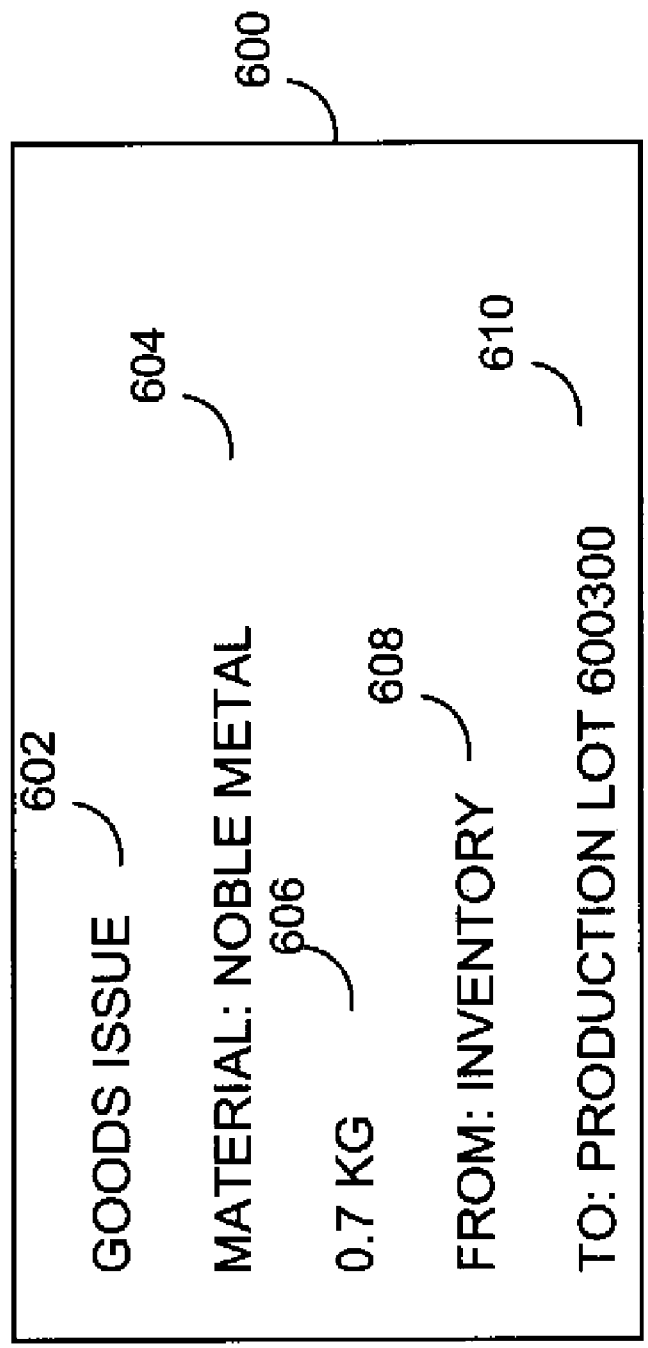
FIG. 6 is a schematic representation of information that may be supplied to the financial system of the system of FIG. 1B, in accordance with some embodiments.

FIG. 6 is a schematic representation of information 600 that may be received by the financial accounting portion 304, in accordance with some embodiments. Referring to FIG. 6, in accordance with some embodiments, the information 600 may comprise a notification indicating that one or more portions of the process have been performed.

The information 600 may include one or more portions 602-610, each of which may include one or more fields. A first portion 602 may indicate the type of process that has been carried out, e.g., goods issue. If the type of process is a goods issue, a second portion 604 may indicate the type of goods that have been issued, e.g., noble metal. It should be noted that such material (e.g., noble metal) is listed in the first entry 416 (FIG. 4) of the bill of materials 402 (FIG. 4). A third portion 606 may indicate the quantity of goods that have been issued, e.g., 0.7 kg. A fourth portion 608 may indicate from where the good were issued, e.g., inventory. A fifth portion 610 may indicate where the goods were issued to, e.g., production lot 600300.

In accordance with some embodiments, the financial accounting portion 304 may receive another notification (not shown), which may be similar in form to the notification 600, indicating that an amount (e.g., 0.3 kg) of the material (e.g.,  noble metal) listed in the second entry 418 (FIG. 4) of the bill of materials 402 (FIG. 4) has been issued from inventory to production lot 600300.

In accordance with some embodiments, the financial accounting portion 304 may further receive another notification (not shown), which may be similar in form to the notification 600, indicating that an amount (e.g., 10 pieces) of the material (e.g., 4711 raw material) listed in the third entry 419 (FIG. 4) of the bill of materials 402 (FIG. 4) has been issued from inventory to production lot 600300.

Figure 7:
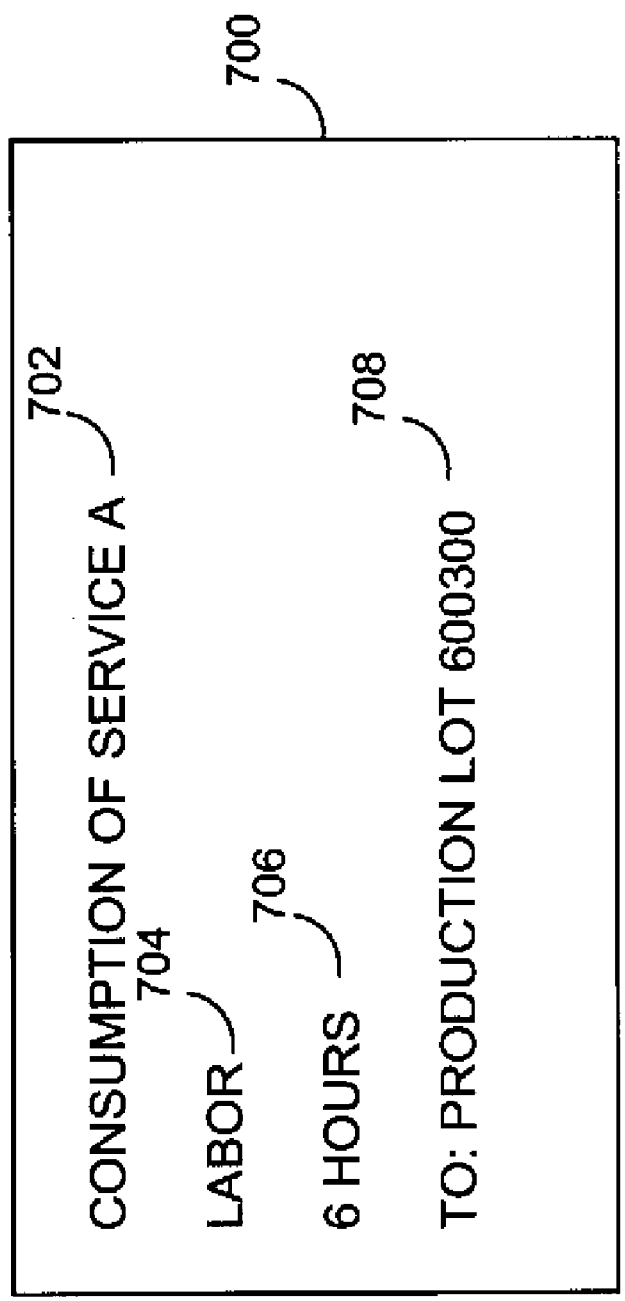
FIG. 7 is a schematic representation of information that may be supplied to the financial system of the system of FIG. 1B, in accordance with some embodiments.

FIG. 7 is a schematic representation of further information 700 that may be received by the financial accounting portion 304, in accordance with some embodiments. Referring to FIG. 7, in accordance with some embodiments, the information 700 may comprise a notification indicating that one or more portions of the process that have been carried.

As with the information 600, the information 700 may include one or more portions 702-708, each of which may include one or more fields. A first portion 702 may indicate the type of process that has been carried out, e.g., consumption of service A. If the type of process is a consumption of a service, a second portion 704 may indicate the type of service that has been consumed, e.g., labor. It should be noted that such labor is listed in the first entry 436 (FIG. 4) of the bill of operations 404 (FIG. 4). A third portion 706 may indicate the quantity consumed, e.g., 6 hours. A fourth portion 708 may indicate where the service was consumed, e.g., production lot 600300.

FIG. 8 is a schematic representation of accounting information 310 (FIG. 3) that may be generated by the financial accounting portion 304 of the financial system 106, in accordance with some embodiments. Referring to FIG. 8, in accordance with some embodiments, the accounting information 310 may define a table having a header 802 and a body 803. The header 802 may include one or more portions, each of which may include one or more fields and/or may define one or more columns. A first portion 804 may define one or more columns for a business transaction type, further described below. A second portion 805 may define a column for information that indicates a type of material used in the process, a type of operation used in the process, a type of overhead and/or a type of material produced by the process, etc. As stated above, such information is sometimes referred to herein as a material/operation/overhead type. A third portion 806 may define a column for an amount. Such amount may indicate an actual amount (cost and/or credit) for such material used in the process, such operation used in the process, such overhead and/or such material produced by the process, etc. A fourth portion 807 may define a column for a first descriptor that may identify a general ledger (GL) account. A fifth portion 808 may define a column for a second descriptor, sometimes referred to herein as a cost revenue element. In accordance with some embodiments, the cost revenue element may be used in associating one or more planned amounts (costs and/or credits) of the cost plan 308 and/or one or more actual amounts (costs and/or credits) of the accounting information 310. The cost revenue element may comprise one or more values, one or more strings, one or more descriptions, one or more codes and/or any other type of information. A sixth portion 809 may define a column for a third descriptor that identifies a cost object. As stated above, the goods and/or services that are sold by a business are sometimes referred to as cost objects. Manufacturing orders, sales orders, service orders and/or projects relating to goods and/or services are also sometimes referred to as cost objects.

The body 803 may include a plurality of rows or entries, e.g., entries 810-822, each of which may include one or more portions. In accordance with some embodiments, each entry may represent a posting for a general ledger or other type of ledger. In some embodiments, the general ledger or other type of ledger may use a cost of sales method of accounting.

As stated above, the accounting information 310 may include actual amounts (costs and/or credits) for each material and/or operation used in the process.

In some embodiments, each entry may include six portions, i.e., a business transaction type, a material/operation/overhead type, material/operation/overhead type, an amount, a first descriptor, which as stated above may identify a GL account, a second descriptor, which as stated above is sometimes referred to herein as a cost revenue element, and third descriptor, which as stated above may identify a cost object. The business transaction type may comprise a description portion of a posting for a general ledger. The business transaction type may indicate whether the entry is associated with (i) a material used in the process, (ii) an operation used in the process, (iii) overhead and/or (iv) material produced by the process, etc. The material/operation/overhead type may further define the material used in the process, the operation used in the process, the overhead and/or the material produced by the process, etc. The amount may define an actual amount (cost and/or credit) associated with the posting (e.g., an actual amount for such material used in the process, operation used in the process, overhead and/or material produced by the process, etc. The GL account may define a GL account that is to be debited and/or credited by the amount of the entry. The cost revenue element may be used in associating the actual amount of the posting with one or more actual amounts of the accounting information 310 and/or one or more planned amounts of the cost plan 308. In some embodiments, such cost revenue element may be determined based at least in part on the business transaction type and the material/operation/overhead type.

For example, a first entry 810 may represent a first posting and may include a first portion 830 that indicates a business transaction type, e.g., 344 goods issue for production, a second portion 832 that indicates a type of material issued, e.g., material A, a third portion 834 that indicates an actual amount for such material, e.g., $700, a fourth portion 836 that indicates a GL account for the entry, e.g., 121000 WIP production, a fifth portion 838 that indicates a cost revenue element for the entry, e.g., 510001 consumption noble metal, and a sixth portion 839 that indicates a cost object, e.g., production lot 600300.

In some embodiments, the first descriptor may include a numeric portion, e.g., 121000, and a description portion, e.g., WIP production. In some embodiments, the numeric portion may identify the GL account and the description portion may also identify the GL account (i.e., the same GL account as identified by the numeric portion). In some embodiments, the description portion may be descriptive, but may not, by itself, be descriptive enough to identify the GL account (i.e., the GL account identified by the numeric portion). In some embodiments, the descriptive portion may comprise a non numeric portion.

In some embodiments, the second descriptor or cost revenue element may also have a form that may identify a GL account. However, as illustrated in FIG. 8, such GL account need not be the same as the GL account that is to be debited and/or credited by the amount of the entry. In some embodiments, the second descriptor or cost revenue element may also include a numeric portion, e.g., 510001, and a description portion, e.g., consumption noble metal. In some embodiment, the numeric portion may identify the GL account and the description portion may also identify the GL account (i.e., the same GL account as identified by the numeric portion). In some embodiments, the description portion may be descriptive, but may not, by itself, be descriptive enough to identify the GL account (i.e., the GL account identified by the numeric portion). In some embodiments, the descriptive portion may comprise a non numeric portion.

A second entry 812 may represent a first posting and may include a first portion 840 that indicates a business transaction type, e.g., 344 goods issue for production, a second portion 842 that indicates a type of material issued, e.g., material B, a third portion 844 that indicates an actual amount for such material, e.g., $300, a fourth portion 846 that indicates a GL account for the entry, e.g., 121000 WIP production, a fifth portion 848 that indicates a cost revenue element for the entry, e.g., 510001 consumption noble metal, and a sixth portion 849 that indicates a cost object, e.g., production lot 600300.

A third entry 814 may represent a second posting and may include a first portion 850 that indicates a business transaction type, e.g., 344 goods issue for production, a second portion 852 that indicates a type of material issued, e.g., material B, a third portion 854 that indicates an actual amount for such material, e.g., $200, a fourth portion 856 that indicates a GL account for the entry, e.g., 121000 WIP production, a fifth portion 858 that indicates a cost revenue element for the entry, e.g., 510005 consumption raw material, and a sixth portion 859 that indicates a cost object, e.g., production lot 600300.

A fourth entry 816 may represent a fourth posting and may include a first portion 860 that indicates a business transaction type, e.g., 403 internal service consumption, a second portion 862 that indicates a type of service consumed, e.g., service A, a third portion 864 that indicates an actual amount for such service, e.g., $300, a fourth portion 866 that indicates a GL account, e.g., 121000 WIP production, a fifth portion 868 that indicates a cost revenue element, e.g., 550000 labor hours, and a sixth portion 869 that indicates a cost object, e.g., production lot 600300.

A fifth entry 818 may represent a fifth posting and may include a first portion 870 that indicates a business transaction type, e.g., overhead, a second portion 872 that indicates a type of overhead, e.g., material, a third portion 874 that indicates an actual amount for such overhead, e.g., $100, a fourth portion 876 that indicates a GL account, e.g., 121000 WIP production, a fifth portion 878 that indicates a cost revenue element, e.g., 580001 material overheads, and a sixth portion 879 that indicates a cost object, e.g., production lot 600300.

A sixth entry 820 may represent a sixth posting and may include a first portion 880 that indicates a business transaction type, e.g., overhead, a second portion 882 that indicates a type of overhead, e.g., service, a third portion 884 that indicates an actual amount for such overhead, e.g., $150, a fourth portion 886 that indicates a GL account, e.g., 121000 WIP production, a fifth portion 888 that indicates a cost revenue element, e.g., 580002 service overheads, and a sixth portion 889 that indicates a cost object, e.g., production lot 600300.

A seventh entry 822 may represent a seventh posting and may include a first portion 890 that indicates a business transaction type, e.g., 303 goods receipt from production, a second portion 892 that indicates a type of goods received, e.g., product, a third portion 894 that indicates an amount for such product, e.g., −$1500, a fourth portion 896 that indicates a GL account, e.g., 121000 WIP production, a fifth portion 898 that indicates a cost revenue element, e.g., 519000 products, and a sixth portion 899 that indicates a cost object, e.g., production lot 600300.

An eighth entry 824 may represent an eighth posting and may include a first portion 899A that indicates a business transaction type, e.g., WIP clearing, a second portion 899B, a third portion 899C that indicates an actual amount for such WIP clearing, e.g., $250, a fourth portion 899D that indicates a GL account, e.g., 121000 WIP production, a fifth portion 899E that indicates a cost revenue element, e.g., 519000 products, and a sixth portion 899F that indicates a cost object, e.g., production lot 600300.

In some embodiments, the accounting information may comprise postings for just one cost object. In some other embodiments, the accounting information may comprise postings for more than one cost object. Although the accounting information 310 is shown having a header and columns, the accounting information 310 may have any form and may or may not have headers and/or columns.

As stated above, the cost plan 308 and the accounting information 310 may each be supplied to the financial analysis portion 306 of the financial system 106, which may generate a report 312 based at least in part thereon. In accordance with some embodiments, the report 312 may include a comparison of one or more planned amounts and one or more actual amounts.

In accordance with some embodiments the cost revenue elements in the cost plan and the cost revenue elements in the accounting information may be used to associate one or more actual amounts and one or more planned amounts. In some embodiments (i) one or more planned amounts of one or more entry having a particular cost revenue element in the cost plan may be associated with (ii) one or more actual amounts of one or more entry having the same and/or corresponding cost revenue element in the accounting information.

In some embodiments, planned costs for entries having the same cost revenue elements may be summed. Actual costs for entries having the same cost revenue elements may be summed. The sum of the planned costs for a cost revenue element may be compared to the sum of the actual costs for such cost revenue element.

FIG. 9A is a schematic representation of a report 312 that may be generated by the financial analysis portion 306 (FIG. 3) of the financial system 106, in accordance with some embodiments. Referring to FIG. 9A, in accordance with some embodiments, the report 312 may comprise a comparison of all planned amounts (e.g., all amounts in the cost plan 308 illustrated in FIG. 5) and all actual amounts (e.g., all amounts in the accounting information 310 illustrated in FIG. 5) for a single cost object (e.g., e.g., production lot 600300).

The report 312 may define a table having a header 902 and a body 904. The header 902 may include one or more portions, each of which may include one or more fields and/or may define one or more columns. A first portion 906 may define a column for a cost revenue element. A second portion 908 may define a column for a planned amount. A third portion 910 may define a column for an actual amount. A fourth portion 912 may define a column for a variance amount.

The body 904 may include a plurality of rows or entries, e.g., entries 920-932, each of which may include one or more portions. In some embodiments, each entry may include four portions, i.e., a cost revenue element, a planned amount, an actual amount and a variance amount.

For example, a first entry 920 may include a first portion 940 that indicates a cost revenue element, e.g., 510001 consumption noble metal, a second portion 942 that indicates a planned amount, e.g., $900, a third portion 944 that indicates an actual amount, e.g., $1000, and a fourth portion 948 that indicates a variance amount, e.g., –$100.

A second entry 922 may include a first portion 950 that indicates a cost revenue element, e.g., 510005 consumption raw metal, a second portion 952 that indicates a planned amount, e.g., $200, a third portion 954 that indicates an actual amount, e.g., $200, and a fourth portion 958 that indicates a variance amount, e.g., $0.

A third entry 924 may include a first portion 960 that indicates a cost revenue element, e.g., 550000 labor hours, a second portion 962 that indicates a planned amount, e.g., $400, a third portion 964 that indicates an actual amount, e.g., $300, and a fourth portion 968 that indicates a variance amount, e.g., $100.

A fourth entry 926 may include a first portion 970 that indicates a cost revenue element, e.g., 580001 material overheads, a second portion 972 that indicates a planned amount, e.g., $95, a third portion 974 that indicates an actual amount, e.g., $100, and a fourth portion 978 that indicates a variance amount, e.g., –$5.

A fifth entry 928 may include a first portion 980 that indicates a cost revenue element, e.g., 580002 service overheads, a second portion 982 that indicates a planned amount, e.g., $150, a third portion 984 that indicates an actual amount, e.g., $150, and a fourth portion 988 that indicates a variance amount, e.g., $0.

A sixth entry 932 may include a first portion 990 that indicates a cost revenue element, e.g., 519000 products, a second portion 992 that indicates a planned amount, e.g., –$1500, a third portion 994 that indicates an actual amount, e.g., –$1250, and a fourth portion 998 that indicates a variance amount, e.g., –$250.

As stated above, in some embodiments, the actual amount of each entry in the report 312 may be determined as a summation of the actual amounts of all posting in the accounting information having the same and/or corresponding cost revenue element. The planned amount of each entry in the report 312 may be determined as a summation of the planned amounts of all entries in the cost plan having the same and/or corresponding cost revenue element.

In that regard, in some embodiments, the actual amount of the first entry 920 in the report 312 may be determined as a summation of the actual amounts of all entries in the accounting information 310 having a first cost revenue element, e.g., 510001 consumption noble metal. The plan amount of the first entry 920 in the report 312 may be determined as a summation of the planned amounts of all entries in the cost plan having the first cost revenue element, e.g., 510001 consumption noble metal.

For example, the first entry 810 of the accounting information 310 and the second entry 812 of the accounting information 310 each have a cost revenue element equal to 510001 consumption noble metal. Thus, the actual amount, e.g., $1000, of the first entry 920 in the report 312 may be determined as a sum of the amount, e.g., $700, of the first entry 810 of the accounting information 310 and the amount, e.g., $300, of the second entry 812 of the accounting information 310.

The first entry 510 of the cost plan 308 and the second entry 512 of the cost plan 308 each have a cost revenue element equal to 510001 consumption noble metal. Thus, the planned amount, e.g., $900, of the first entry 920 of the report 312 may be determined as a sum of the amount, e.g., $600, of the first entry 510 of the cost plan 308 and the amount, e.g., $300, of the second entry 512 of the cost plan 308.

The variance amount, e.g., –$100, of the first entry 920 of the report 312 may be determined as a difference between the plan amount, e.g., $900, of the first entry 920 of the report 312 and the actual amount, e.g., $1000, of the first entry 920 of the report 312.

The actual amount of the second entry 922 in the report 312 may be determined as a summation of the actual amounts of all entries in the accounting information 310 having a second cost revenue element, e.g., 510005 consumption raw material. The plan amount of the second entry 922 in the report 312 may be determined as a summation of the planned amounts of all entries in the cost plan having the second cost revenue element, e.g., 510005 consumption raw material.

Only the third entry 514 of the cost plan 308 has a cost revenue element equal to 510005 consumption raw material. Thus, the planned amount, e.g., $200, of the second entry 922 of the report 312 may be equal to the amount, e.g., $200, of the third entry 514 of the cost plan 308.

Only the third entry 814 of the accounting information 310 has a cost revenue element equal to 510005 consumption raw material. Thus, the actual amount, e.g., $200, of the second entry 922 in the report 312 may be equal to the amount, e.g., $200, of the third entry 814 of the accounting information 310.

The variance amount, e.g., $0, of the second entry 922 of the report 312 may be determined as a difference between the plan amount, e.g., $200, of the second entry 922 of the report 312 and the actual amount, e.g., $200, of the second entry 922 of the report 312.

And so on.

Thus, in some embodiments, a plurality of entries in the cost plan 308 may be associated with a plurality of entries in the accounting information 310.

As stated above, in some other embodiments, the report 312 may comprise a comparison of fewer than all planned amounts and fewer than all actual amounts for one or any other number of cost objects.

In some embodiments, a separate report may be generated for the cost plan 308 and/or the accounting information 310. FIG. 9B is a schematic representation of a separate report 999B that may be generated by the financial analysis portion 306 (FIG. 3) of the financial system 106 for the cost plan 308, in accordance with some embodiments. FIG. 9C is a schematic representation of a separate report 999C that may be generated by the financial analysis portion 306 (FIG. 3) of the financial system 106 for the accounting information 310, in accordance with some embodiments. In some embodiments, entries of the reports 999B-999C illustrated in FIGS. 9B-9C may be generated prior to entries of the report 312 illustrated in FIG. 9A, which may thereafter be generated based on the entries of the reports 999B-999C illustrated in FIGS. 9B-9C.

Figure 10A:
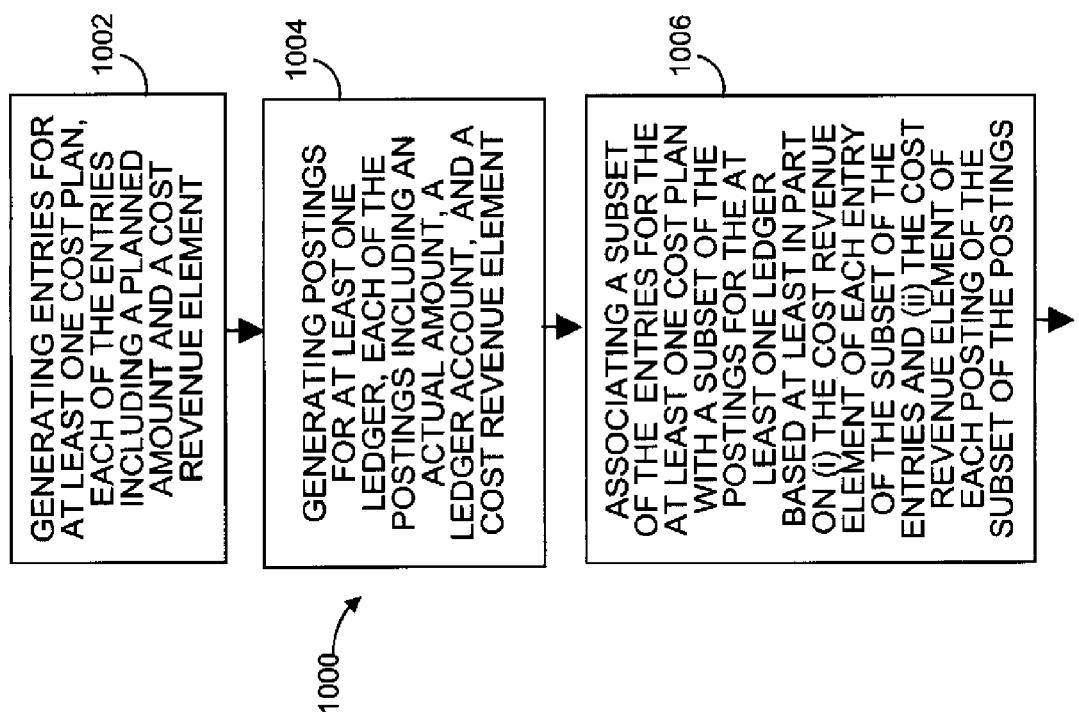
FIG. 10A is a flow chart of a method, in accordance with some embodiments.

FIG. 10A is a flow chart of a method 1000 according to some embodiments. The method 1000 is not limited to the order shown in the flow chart. Rather, embodiments of the method 1000 may be performed in any order that is practicable. For that matter, unless stated otherwise, any method disclosed herein may be performed in any order that is practicable. Moreover, unless stated otherwise, the method 1000 may be performed by in any manner. In that regard, in some embodiments, one or more portions of one or more methods disclosed herein may be performed by a processing system. In some embodiments, the method 1000, or one or more portions thereof, may be performed by the processing system 100 or one or more portions thereof. As further described herein, in some embodiments, a processing system may comprise hardware, software (including microcode), firmware, or any combination thereof.

In accordance with some embodiments, the method 1000 may be used to generate the report 312. In some embodiments, the method 1000 may be used to generate the report 312 based at least in part on the cost plan 308 and the accounting information 310.

Referring to FIG. 10A, at 1002, the method may include generating entries for at least one cost plan. Each of the entries may include a planned amount and a cost revenue element.

At 1004, the method may further include generating postings for at least one ledger. Each of the postings may include a ledger account, an actual amount and a cost revenue element. In accordance with some embodiments, the at least one ledger may comprise at least one ledger that might be posted by the use of a cost of sales method of accounting.

At 1006, the method may further include associating a subset of the entries for the at least one cost plan with a subset of the postings for the at least one ledger based at least in part on (i) the cost revenue element of each entry of the subset of the entries and (ii) the cost revenue element of each posting of the subset of the postings.

As used herein, a subset comprises less than all of a respective set. Thus, a subset of the entries for the at least one cost plan includes less than all of the entries for the at least one cost plan. A subset of the postings for the at least one ledger includes less than all of the postings for the at least one ledger.

As stated above, in some embodiments, more than one entry in the accounting information may have the same and/or corresponding cost revenue element. Likewise, in some embodiments, more than one entry in the cost plan may have the same and/or corresponding cost revenue element.

Figure 10B:
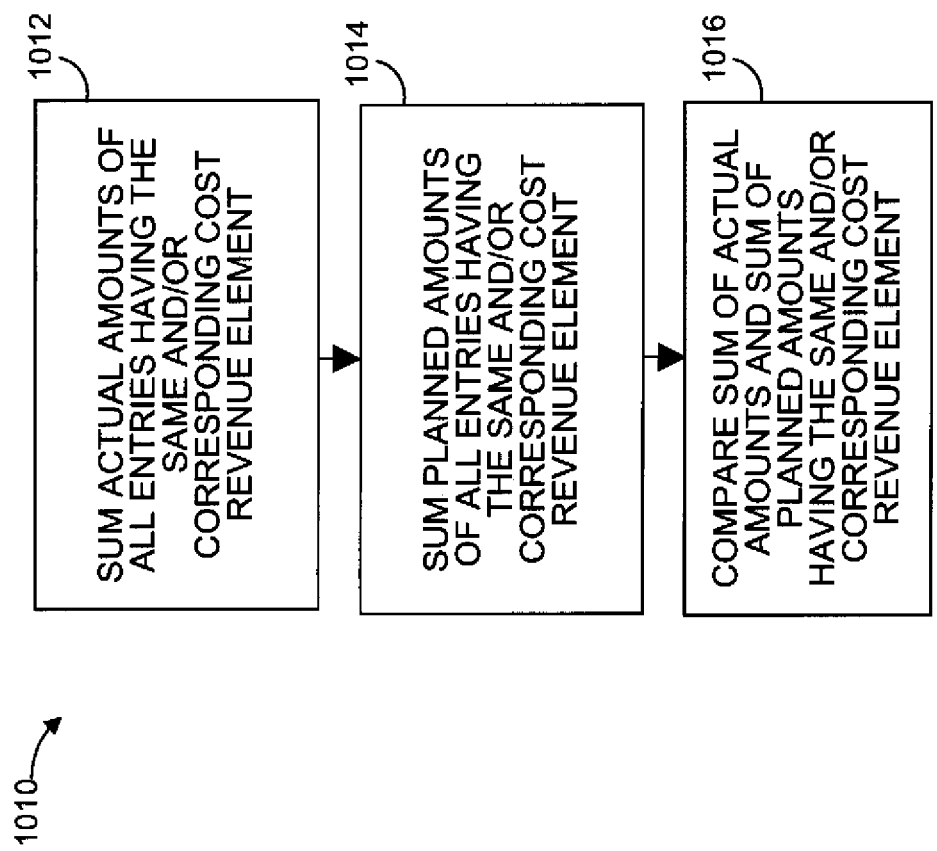
FIG. 10B is a flow chart of a method, in accordance with some embodiments.

FIG. 10B is a flow chart of a method 1010 according to some embodiments. Embodiments of the method 1010 may be performed in any order that is practicable. In that regard, in some embodiments, one or more portions of one or more methods disclosed herein may be performed by a processing system. In some embodiments, the method 1010, or one or more portions thereof, may be performed by the processing system 100 or one or more portions thereof. As further described herein, in some embodiments, a processing system may comprise hardware, software (including microcode), firmware, or any combination thereof.

In some embodiments, one or more portions of the method 1010 may be used at 1006 in the method 1000 (FIG. 10A)

Referring to FIG. 10B, at 1012 the method may include summing the actual amounts (costs and/or credits) of all entries having the same and/or corresponding cost revenue element. In some embodiments, 1012 may include (i) determining the type of report and/or comparison that is desired, (ii) identifying postings in one or more ledgers that are to be included in the report and/or comparison, (iii) selecting one of the identified postings, (iv) identifying all of the identified postings having the same cost revenue element as the selected posting, and/or (v) summing the actual amount of the selected posting and any postings identified as having the same cost revenue element as the selected posting.

At 1014, the method may further include summing the planned amounts of all entries having the same and/or corresponding cost revenue element. In some embodiments, 1014 may include (i) determining the type of report and/or comparison that is desired, (ii) identifying the entries in a cost plan that are to be included in the report and/or comparison, (iii) selecting one of the identified entries, (iv) identifying all of the identified entries having the same cost revenue element as the selected entry and/or (v) summing the plan amount of the selected entry and any entries identified as having the same cost revenue element as the selected entry.

At 1016, the method may further include comparing the sum of the actual amounts and the sum of planned amounts having the same and/or corresponding cost revenue element.

In accordance with some embodiments, the cost revenue element may be determined independently of the cost object. Thus, in some embodiments, planned and/or actual costs associated with one cost object may be compared with planned and/or actual costs associated with another cost object. Thus, the report may include planned and/or actual costs for more than one cost object. In some embodiments, the cost plan 308 may be associated with one cost object and the accounting information 310 may be associated with another cost object. In that regard, in some embodiments, the cost plan 308 may be associated with a sales order and the accounting information 310 may be associated with a production lot. In some embodiments, such production lot may be associated with such sales order, e.g., the production lot may be produced in accordance with the sales order.

Figure 11:
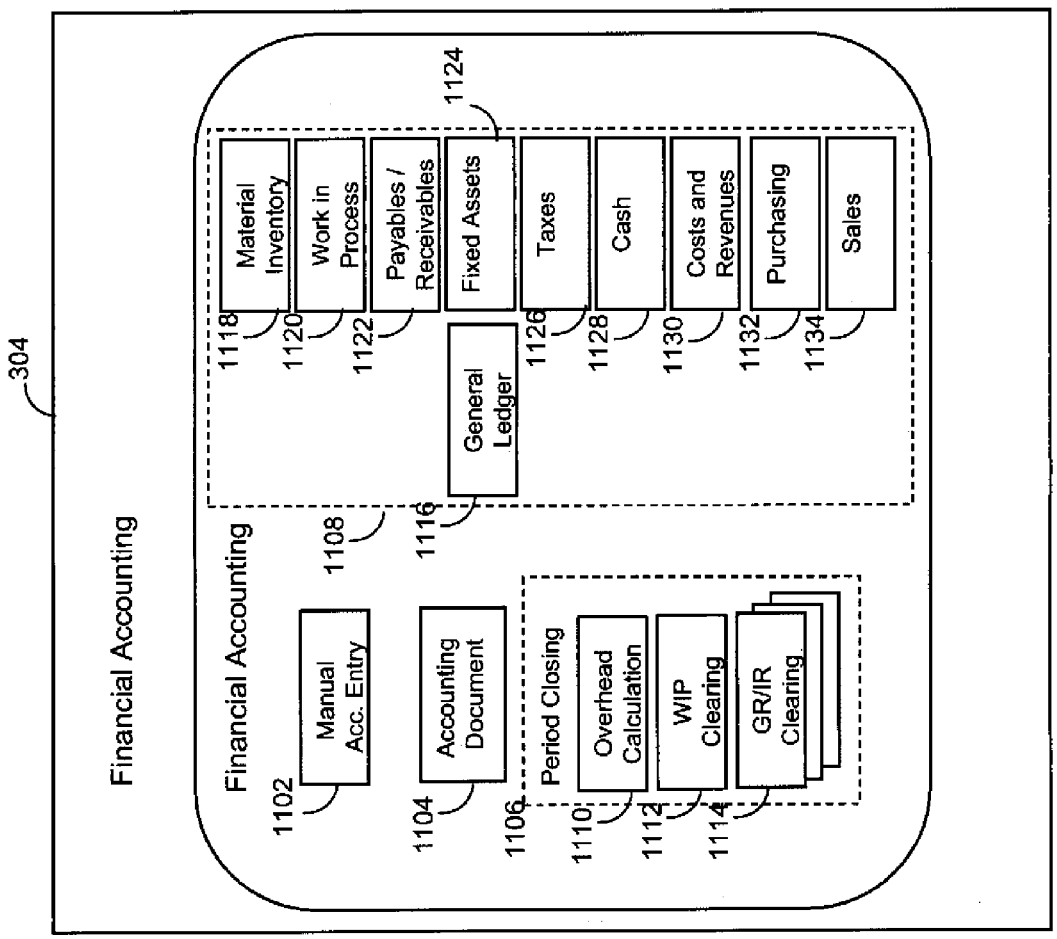
FIG. 11 is a functional block diagram of a portion of the financial system of the system of FIG. 1B, in accordance with some embodiments.

FIG. 11 is a functional block diagram of the financial accounting portion 304 of the financial system 106, in accordance with some embodiments. Referring to FIG. 11, in accordance with some embodiments, the financial accounting portion 304 may include a manual account entry portion 1102, an accounting document portion 1104, a period closing portion 1106 and a ledger portion 1108.

The period closing portion 1106, which may perform functions associated with an end of a financial period, may include an overhead calculation portion 1110, a work in process (WIP) portion 1112 and a GR/IR portion 1114.

The ledger portion 1108 may include a general ledger 1116 and a plurality of sub-ledgers including a material inventor sub-ledger 1118, a WIP (or production) sub-ledger 1120, a payable/receivable sub-ledger 1122, a fixed asset sub-ledger 1124, a tax sub-ledger 1126, a cash sub-ledger 1128, a cost and revenue sub-ledger 1130, a sales sub-ledger 1132 and a purchasing sub-ledger 1134.

Figure 12:
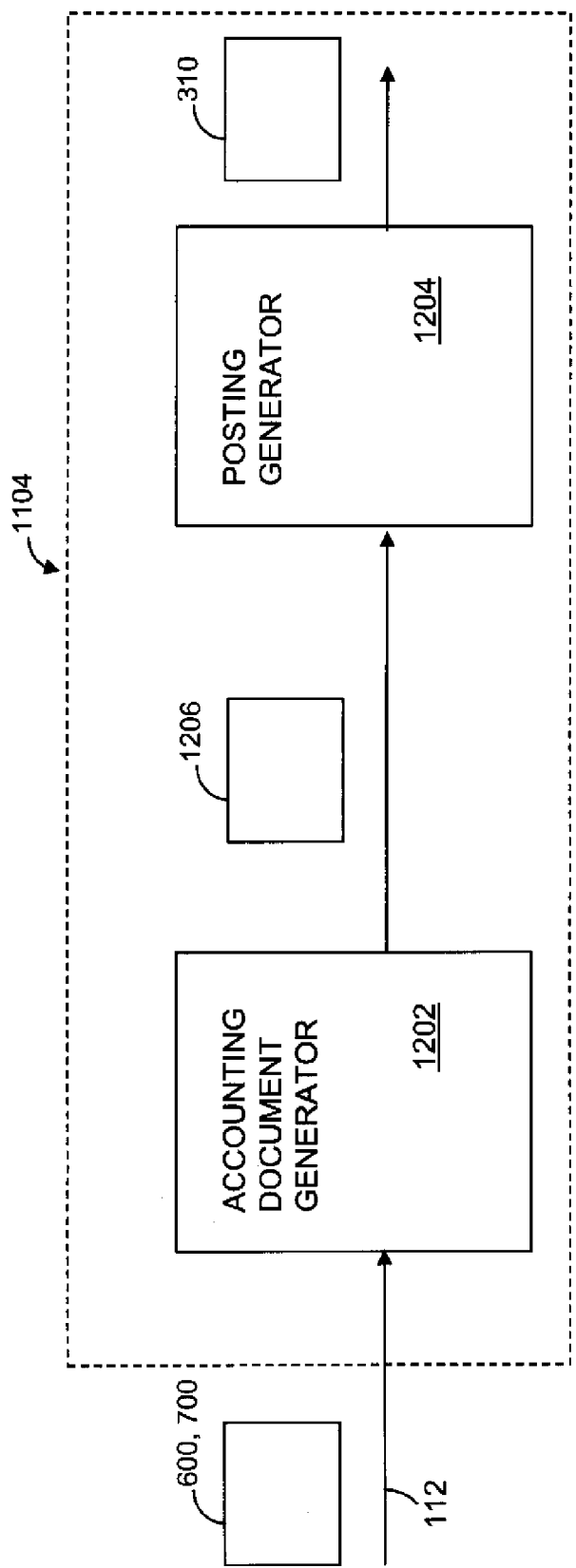
FIG. 12 is a functional block diagram of a portion of the financial system of the system of FIG. 1B, in accordance with some embodiments.

FIG. 12 is a functional block diagram of a portion of accounting document portion 1104, in accordance with some embodiments. Referring to FIG. 12, in accordance with some embodiments, the accounting document portion 1104 may include an accounting document generator 1202 and a posting generator 1204.

The accounting document generator 1202 may receive the information 600, 700 supplied to financial accounting portion 304 and may generate one or more accounting documents 1206 based at least in part on such information 600, 700. The accounting documents 1206 may be supplied to the posting generator 1204, which may generate the accounting information 310 based at least in part on the accounting documents 1206. In accordance with some embodiments, the document may have any form.

FIG. 13 is a schematic representation of an account document 1206 that may be generated by the account document generator 1202 (FIG. 12) in response to the information 600 (FIG. 6), in accordance with some embodiments.

Referring to FIG. 13, in accordance with some embodiments, the account document 1206 may include a header 1302 and a body 1304. The header may include one or more portions 1306-1324, each of which may include one or more fields. In some embodiments, a first portion 1302 may indicate a name of a business or other type of entity, e.g., UL Jav, Inc. A second portion 1304 may indicate a document number, e.g., 1200000586. A third portion 1306 may indicate a document type, e.g., CINV. A fourth portion 1308 may indicate an original entry document type, e.g., goods issue. A fifth portion 1310 may indicate an original entry document number, e.g., 5557389574. A sixth portion 1312 may indicate a document date, e.g., Apr. 1, 2007. A seventh portion 1314 may indicate a posting date, e.g., Apr. 1, 2007. An eighth portion 1316 may indicate an accounting period, e.g., April 2007. A ninth portion 1318 may indicate a transaction currency, e.g., U.S. dollars. A tenth portion 1320 may indicate a currency conversion date, e.g., Apr. 1, 2007.

The body may include one or more entries 1326-1328. A first entry 1326 may include portions 1330-1350, each of which may include one or more fields. A first portion 1330 may indicate an entry number, e.g., 001. A second portion 1332 may indicate an account type, e.g., WIP. A third portion 1334 may indicate a cost object, e.g., production lot 600300. A fourth portion 1336 may indicate a general ledger (GL) account, e.g., 121000. A fifth portion 1338 may indicate a cost revenue element, e.g., 5100005. A sixth portion 1340 may indicate whether the entry is a debit (D) or a credit (C); e.g., a debit (D). A seventh portion 1342 may indicate a currency amount, e.g., two hundred U.S. dollars ($200), associated with the first entry 1326.

A second entry 1328 may include portions 1330-1350, each of which may include one or more fields. A first portion 1350 may indicate an entry number, e.g., 002. A second portion 1352 may indicate an account type, e.g., stock. A third portion 1354, which may be blank, may indicate that the entry has no cost object. A fourth portion 1356 may indicate a general ledger (GL) account, e.g., 300000. A fifth portion 1358, which may be blank, may indicate that the entry has no cost revenue element. A sixth portion 1360 may indicate whether the entry is a debit (D) or a credit (C); e.g., a credit (C). A seventh portion 1362 may indicate a currency amount, e.g., two hundred U.S. dollars ($200), associated with the second entry 1328.

FIG. 14 is a schematic representation of an account document 1206 that may be generated by the account document generator 1202 (FIG. 12) in response to the information 700 (FIG. 7), in accordance with some embodiments. Referring to FIG. 14, in accordance with some embodiments, the account document 1206 may include a header 1402 and a body 1404. The header 1402 may include one or more portions 1406-1424, each of which may include one or more fields. A first portion 1402 may indicate a name of a business or other type of entity, e.g., UL Jav, Inc. A second portion 1404 may indicate a document number, e.g., 1200000586. A third portion 1406 may indicate a document type, e.g., CINV. A fourth portion 1408 may indicate an original entry document type, e.g., consumption. A fifth portion 1410 may indicate an original entry document number, e.g., 5557389574. A sixth portion 1412 may indicate a document date, e.g., Apr. 1, 2007. A seventh portion 1414 may indicate a posting date, e.g., Apr. 1, 2007. An eighth portion 1416 may indicate an accounting period, e.g., April 2007. A ninth portion 1418 may indicate a transaction currency, e.g., U.S. dollars. A tenth portion 1420 may indicate a currency conversion date, e.g., Apr. 1, 2007.

The body may include one or more entries 1426-1428. A first entry 1426 may include portions 1430-1442, each of which may include one or more fields. A first portion 1430 may indicate an entry number, e.g., 001. A second portion 1432 may indicate an account type, e.g., WIP. A third portion 1434 may indicate a cost object, e.g., production lot 600300. A fourth portion 1436 may indicate a general ledger (GL) account, e.g., 121000. A fifth portion 1438 may indicate a cost revenue element, e.g., 550000. A sixth portion 1440 may indicate whether the entry is a debit (D) or a credit (C); e.g., a debit (D). A seventh portion 1442 may indicate a currency amount, e.g., three hundred U.S. dollars ($300), associated with the first entry 1426.

A second entry 1428 may include portions 1430-662, each of which may include one or more fields. A first portion 1450 may indicate an entry number, e.g., 002. A second portion 1452 may indicate an account type, e.g., overhead. A third portion 1454, which may be blank, may indicate that the entry has no cost object. A fourth portion 1456 may indicate a general ledger (GL) account, e.g., 550000. A fifth portion 1458, which may be blank, may indicate that the entry has no cost revenue element. A sixth portion 1460 may indicate whether the entry is a debit (D) or a credit (C); e.g., a credit (C). A seventh portion 1462 may indicate a currency amount, e.g., two hundred U.S. dollars ($300), associated with the second entry 1428.

Figure 15:
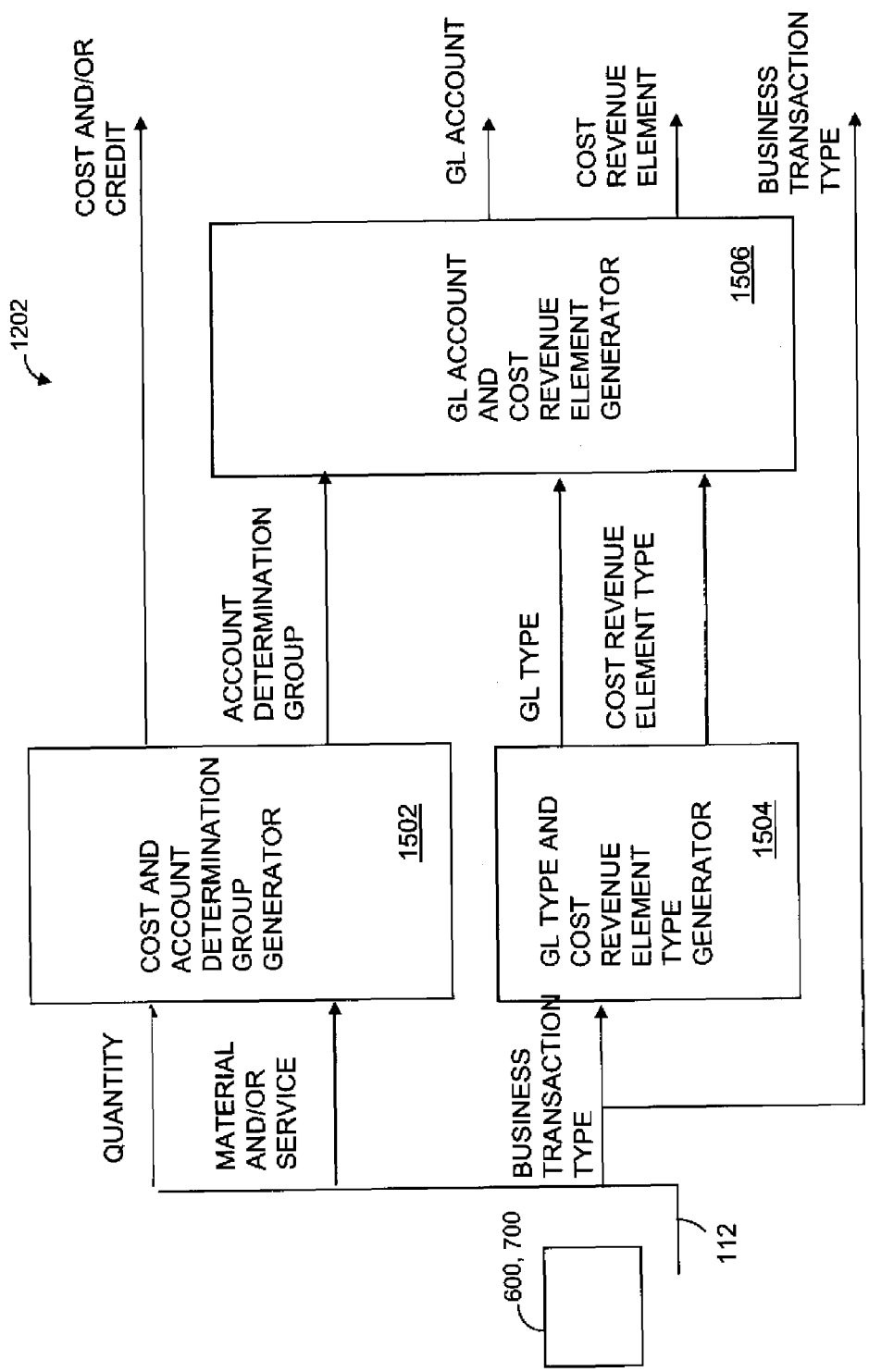
FIG. 15 is a functional block diagram of a portion of the financial system of the system of FIG. 1B, in accordance with some embodiments.

FIG. 15 is a block diagram of a portion of the accounting document generator 1202 (FIG. 12) in accordance with some embodiments. Referring to FIG. 15, in some embodiments, the portion of the accounting document generator 1202 may comprise a cost and account determination group generator 1502, a GL type and cost revenue element type generator 1504 and a GL account and cost revenue element generator 1506.

The cost and account determination group generator 1502 may receive information indicative of a type of material issued, e.g., portion 604 (FIG. 6) of information 600 (FIG. 6), and/or a type of service consumed, e.g., portion 704 (FIG. 7) of information 700 (FIG. 7), and may determine, based at least in part on such material or service, an account determination group associated with such material and/or service.

In some embodiments, the cost and account determination group generator 1502 may comprise a look-up table or other mapping that defines an association between types of materials and/or services and account determination groups. For example, if the account determination group converter 1502 comprises a look up table, a first address of the look up table may store a first account determination group associated with a first type of material. A second address of the look up table may store a second account determination group associated with a second type of material. And so on.

The cost and account determination group generator 1502 may further receive information indicative of the quantity of material issued, e.g., portion 606 (FIG. 6) of information 600 (FIG. 6), and/or the quantity of the service consumed, e.g., portion 706 (FIG. 7) of information 700 (FIG. 7), and may determine, based at least in part on such quantity of material and/or service, an amount (cost and/or credit) associated with such quantity of material and/or service.

In some embodiments, the cost and account determination group generator 1502 may comprise a look-up table or other mapping that defines a price associated with given quantities of materials and/or services. The cost and account determination group generator 1502 may determine the amount (cost and/or credit) associated with the quantity of material issued and/or service consumed by multiplying (i) the quantity of material issued and/or service consumed by (ii) the price of the material and/or service.

Figure 16:
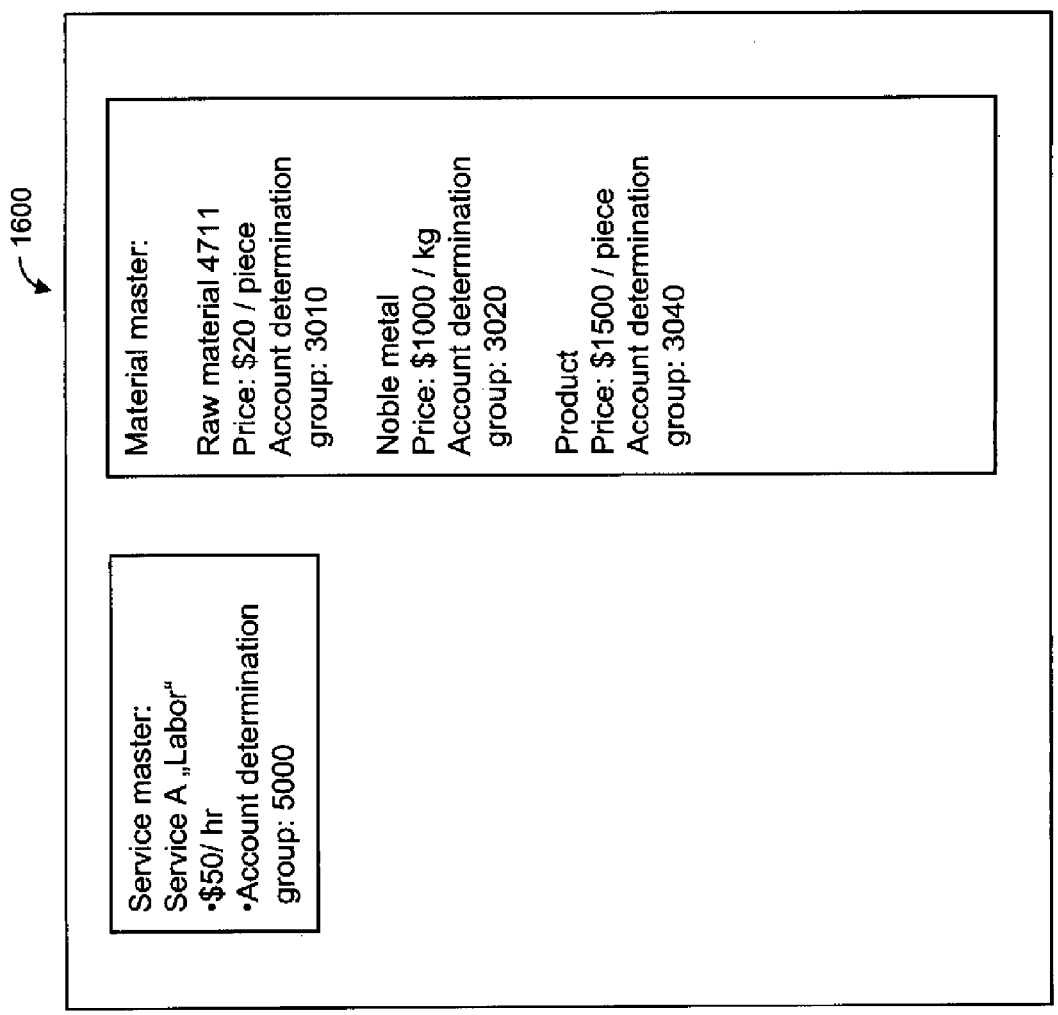
FIG. 16 is a block diagram representation of a portion of a database that may be used by the financial system of the system of FIG. 1B, in accordance with some embodiments.

In some embodiments, one or more of such look-up tables or other mappings may be defined by a database, sometimes referred to herein as a material master and/or service master database. FIG. 16 is a block diagram representation of a portion of a material master and/or service master database 1600 that defines: (i) an association between types of materials and/or services and account determination groups and (ii) a price and/or credit associated with given quantities of such materials and/or services. In some embodiments, for example, a material, e.g., 4711 raw material, may have an account determination group of 3010 and a cost of $20/piece. A service, e.g., service A or labor, may have an account determination group of 5000 and a cost of $50/hr.

The GL type and cost revenue element type generator 1504 may receive the information indicative of the business transaction type, e.g., portion 602 (FIG. 6) of information 600 (FIG. 6) and/or portion 702 (FIG. 7) of information 700 (FIG. 7), and may determine, based at least in part on the business transaction type, a classification, sometimes referred to herein as a GL type, and may further determine another classification, sometimes referred to herein as a cost revenue element type, associated with such business transaction type.

In some embodiments, the GL type and cost revenue element type generator 1504 may comprise a look-up table or other mapping that defines an association between business transaction types and GL types. For example, if the GL type and cost revenue element type generator 1504 comprises a look up table, a first address of the look up table may store a first GL type associated with a first business transaction type. A second address of the look up table may store a second GL type associated with a second business transaction type. And so on.

In some embodiments, the GL type and cost revenue element type generator 1504 may comprise a look-up table or other mapping that defines an association between business transaction types and cost revenue element types. For example, if the GL type and cost revenue element type generator 1504 comprises a look up table, a first address of the look up table may store a first cost revenue element type associated with a first business transaction type. A second address of the look up table may store a second cost revenue element type associated with a second business transaction type. And so on.

As further described hereinafter, in some embodiments, a single classification or cost revenue element type may be associated with more than one description or business transaction type. As further described hereinafter, in some embodiments, this may help facilitate the generation of a report that is consolidated (i.e., has less entries) compared to the postings.

The account determination group, the GL type and the cost revenue element type may each be supplied to the GL account and cost revenue element generator 1506. The GL account and cost revenue element generator 1506 may determine, based at least in part on the account determination group and the GL type, a GL account associated with the combination of such account determination group and GL type. The GL account and cost revenue element generator 1506 may also determine, based at least in part on the account determination group and the cost revenue element type, a cost revenue element associated with the combination of such account determination group and GL type.

In some embodiments, the GL account and cost revenue element generator 1506 may comprise one or more look up tables or other mapping that may be used to define the GL account based at least in part on the account determination group and GL type. In addition, in some embodiments, the GL account and cost revenue element generator 1506 may comprise one or more look up tables or other mapping that may be used to define the cost revenue element based at least in part on the account determination group and cost revenue element type.

In accordance with some embodiments, the one or more look up tables or other mapping used to define the cost revenue element may be the same look up tables or other mapping used to define the GL account. In accordance with some embodiments, such look up tables or other mapping may be adapted to receive two inputs and generate one output. The look up tables or other mapping may generate the GL account if supplied with the account determination group and GL type. The look up tables or other mapping may generate the cost revenue element if supplied with the account determination group and cost revenue element type.

Figure 17:
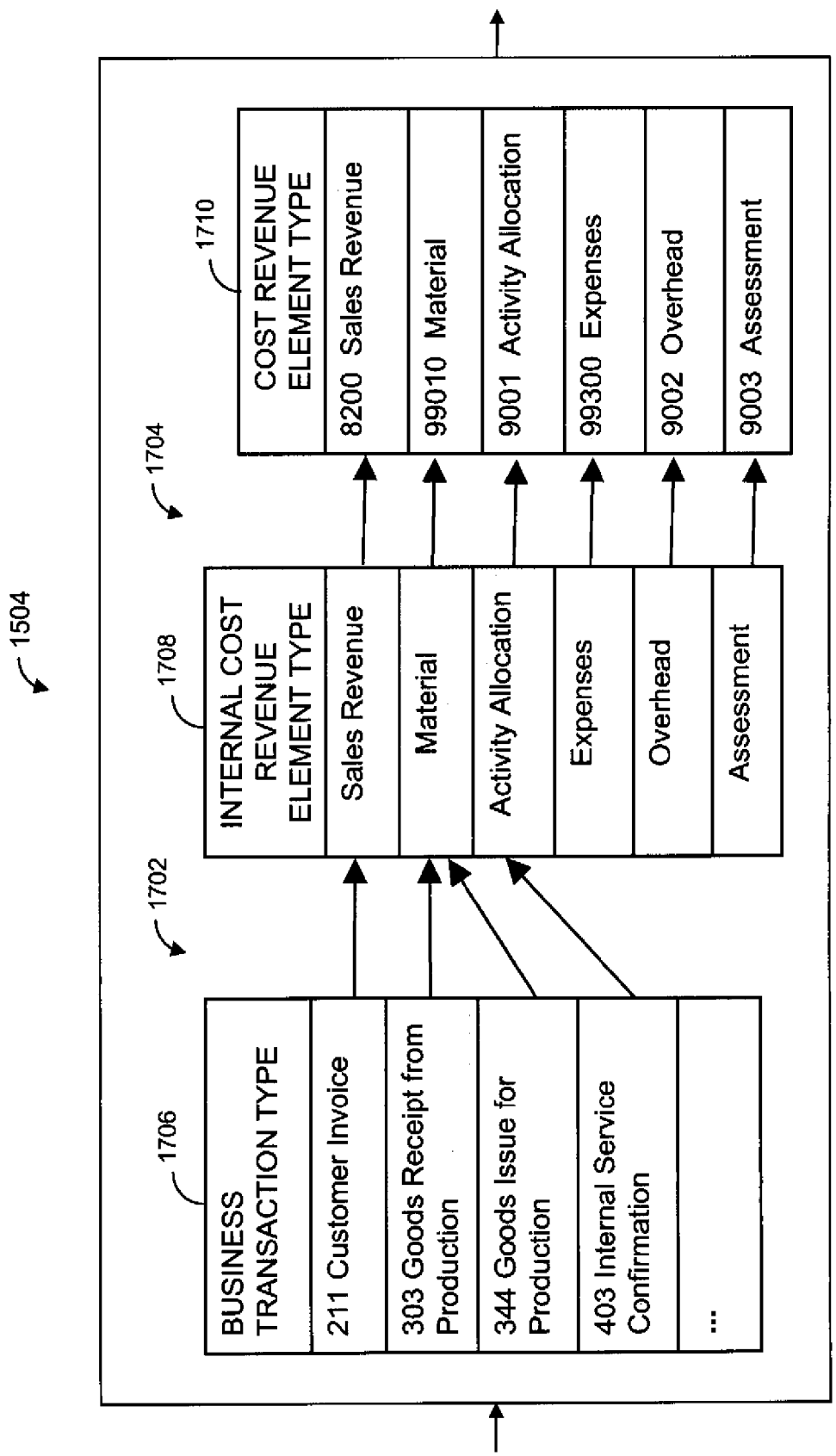
FIG. 17 is a functional block diagram of a portion of the financial system of the system of FIG. 1B, in accordance with some embodiments.

FIG. 17 is a schematic representation of a portion of the GL type and cost revenue element type generator 1504, in accordance with some embodiments. Referring to FIG. 17, in accordance with some embodiments, the portion of the GL type and cost revenue element type generator 1504 may comprise a mapping that defines an association between business transaction types and cost revenue element types.

In some embodiments, the mapping may comprise two mappings 1702-1704. A first mapping 1702 may define an association between business transaction types 1706 and internal cost revenue element types 1708. The second mapping 1704 may define an association between internal cost revenue element types 1708 and cost revenue element types 1710.

In some embodiments, a first classification, e.g., 8200 sales revenue, may be associated with a first description, 211 customer invoice. A second classification, e.g., 99010 material, may be associated with a second description, e.g., 303 goods receipt from production, and a third description, e.g., 344 goods issue for production. And so on.

Thus, as stated above, in some embodiments, a single classification or cost revenue element type, e.g., 99010 material, may be associated with more than one description or business transaction type, e.g., 303 goods receipt from production and 344 goods issue for production. In some embodiments, this may help facilitate the generation of a report that is consolidated (i.e., has less entries) compared to the postings.

Figure 18:
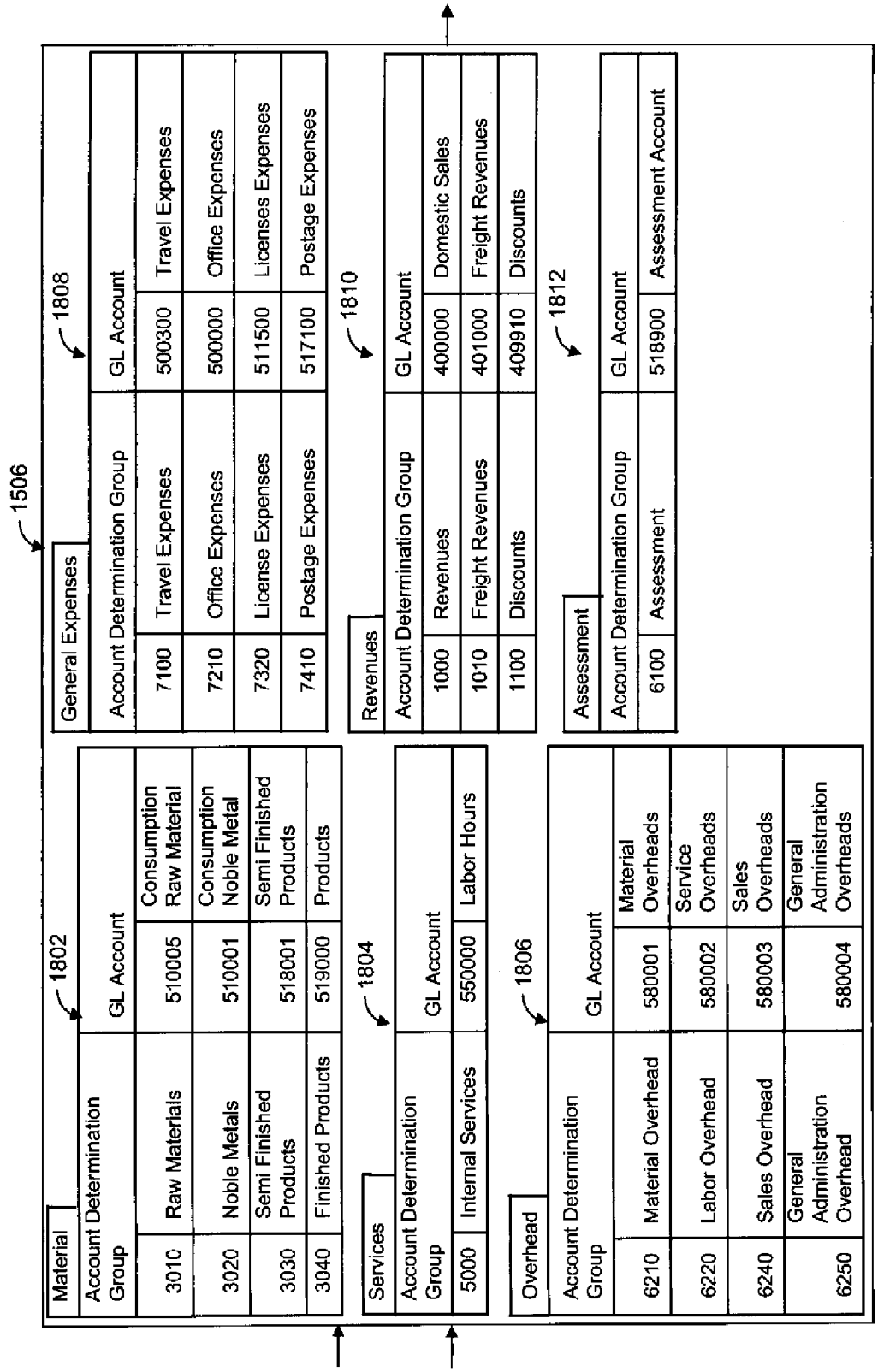
FIG. 18 is a functional block diagram of a portion of the financial system of the system of FIG. 1B, in accordance with some embodiments.

FIG. 18 is a schematic representation of the GL account and cost revenue element generator 1506, in accordance with some embodiments. Referring to FIG. 18, in accordance with some embodiments, the GL account and cost revenue element generator 1506 may comprise a plurality of look up tables 1802-1812. A first look up table 1802 may be used to define the GL account if the GL type is equal to a first classification, e.g., material, and may also be used to define the cost revenue element if the cost revenue type is equal to the first classification, e.g., material. For example, if the GL type is equal to material and the account determination group is equal to 3010, the GL account may be defined as 510005 consumption raw material. If the GL type is equal to material and the account determination group is equal to 3020, the GL account may be defined as 510001 consumption noble metal. Similarly, if the cost revenue element type is equal to material and the account determination group is equal to 3010, the cost revenue element may be defined as 510005 consumption raw material. If the cost revenue element type is equal to material and the account determination group is equal to 3020, the cost revenue element may be defined as 510001 consumption noble metal. And so on.

A second look up table 1804 may be used to define the GL account if the GL type is equal to a second classification, e.g., services, and may be used to define the cost revenue element if the cost revenue type is equal to the second classification, e.g., services. A third look up table 1806 may be used to define the GL account if the GL type is equal to a third classification, e.g., overhead, and may be used to define the cost revenue element if the cost revenue element type is equal to the third classification, e.g., overhead. A fourth look up table 1808 may be used to define the GL account if the GL type is equal to a fourth classification, e.g., general expenses, and may be used to define the cost revenue element if the cost revenue element type is equal to the fourth classification, e.g., general expenses. A fifth look up table 1810 may be used to define the GL account if the GL type is equal to a fifth classification, e.g., revenues, and may be used to define the cost revenue element if the cost revenue element type is equal to the fifth classification, e.g., revenues. A sixth look up table 1812 may be used to define the GL account if the GL type is equal to a sixth classification, e.g., assessment, and may be used to define the cost revenue element if the cost revenue element type is equal to the sixth classification, e.g., assessment.

In some embodiments, the accounting document generator 1202 (FIG. 12) may generate accounting documents for all applicable portions of the financial system 160 (FIG. 1B) and/or all applicable sub-ledgers, e.g., sub-ledgers 1118-1134 (FIG. 11), of the ledger portion 1108 (FIG. 11) of the financial system 106.

Figure 19:
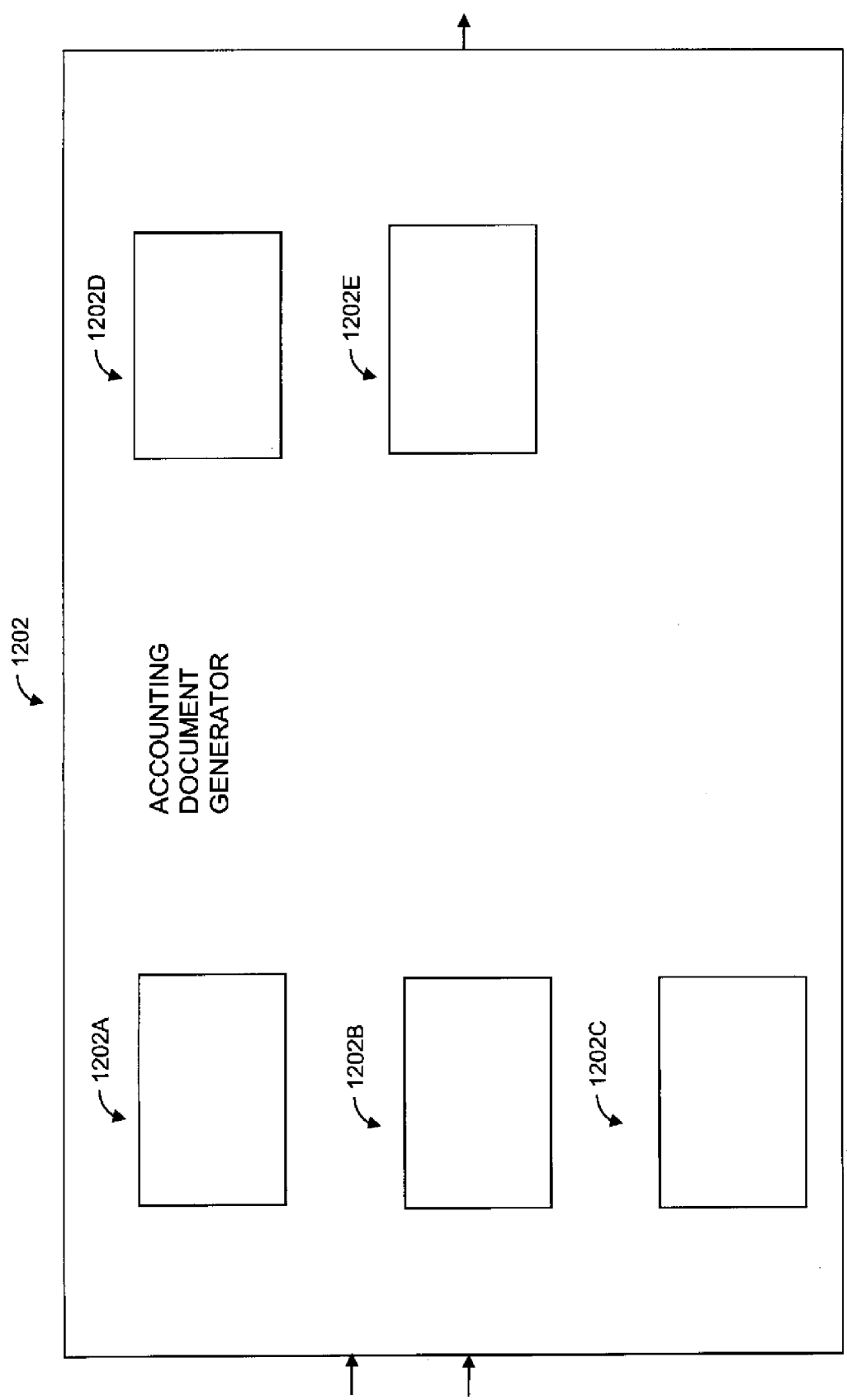
FIG. 19 is a functional block diagram of a portion of the financial system of the system of FIG. 1B, in accordance with some embodiments.

FIG. 19 is a schematic block diagram of a portion of the accounting document generator 1202 (FIG. 12) in accordance with some embodiments. Referring to FIG. 19, in accordance with some embodiments, the accounting document generator 1202 may comprise a plurality of accounting document generators, e.g., accounting document generators 1202A-1202E. In some embodiments, each of the plurality of accounting document generators, e.g., accounting document generators 1202A-1202E, may be the same as and/or similar to the accounting document generator 1202 described above. In some embodiments, one or more of the plurality of accounting document generators may be different that one or more other accounting document generators of the plurality of accounting document generators.

In one embodiment, a first accounting document generator 1202A may generate accounting documents for a production sub-ledger of the ledger portion 1108 (FIG. 11). A second accounting document generator 1202B may generate accounting documents for a CRM sales sub-ledger of the ledger portion 1108 (FIG. 11). A third accounting document generator 1202C may generate accounting documents for a CRM services sub-ledger of the ledger portion 1108 (FIG. 11). A fourth accounting document generator 1202D may generate accounting documents for a costings sub-ledger of the ledger portion 1108 (FIG. 11). A fifth accounting document generator 1202E may generate accounting documents for an overheads sub-ledger of the ledger portion 1108 (FIG. 11).

Figure 20:
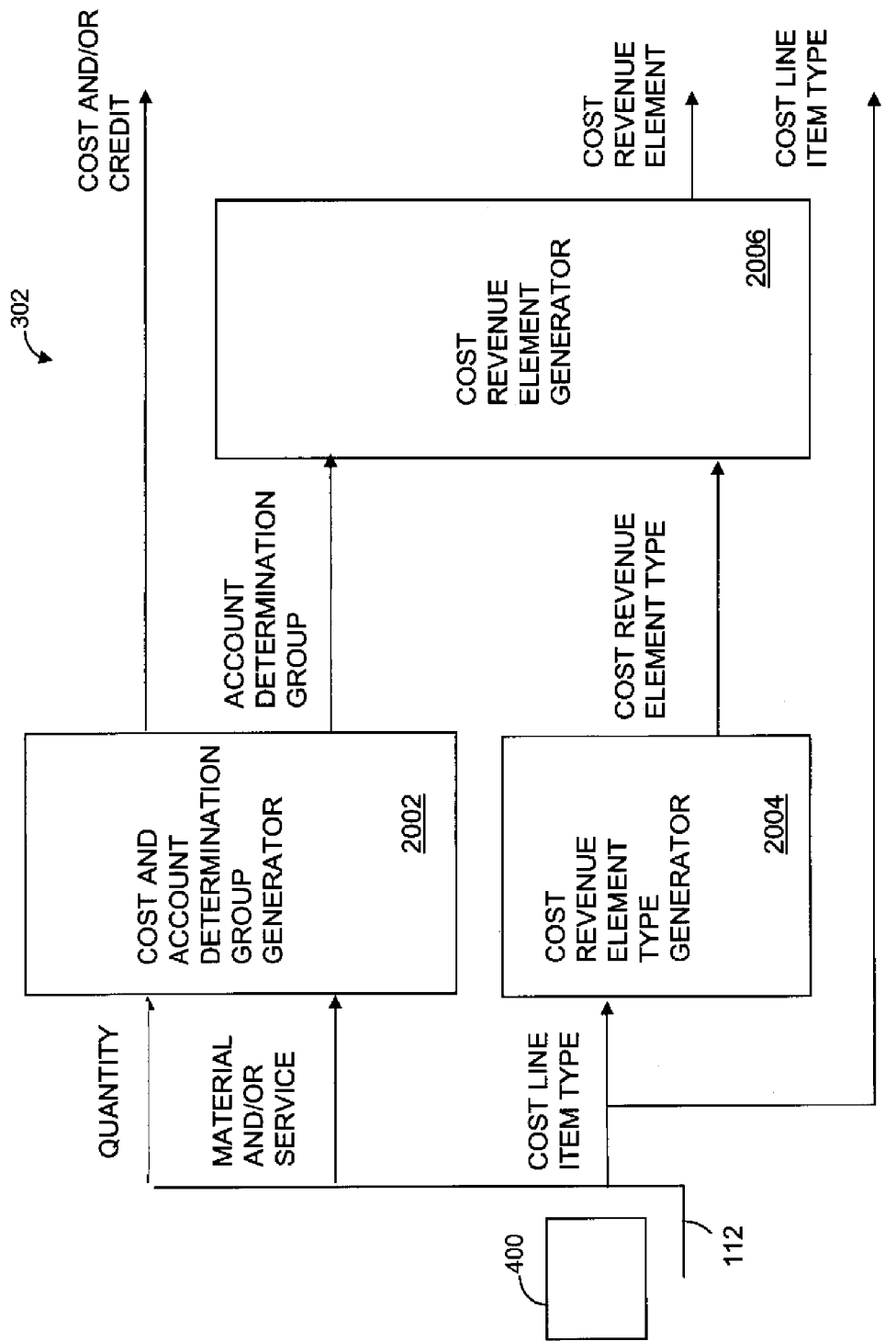
FIG. 20 is a functional block diagram of a portion of the financial system of the system of FIG. 1B, in accordance with some embodiments.

FIG. 20 is a block diagram of a portion of the financial planning portion 302 of the financial system 106 (FIG. 1B), in accordance with some embodiments. Referring to FIG. 20, in some embodiments, the financial planning portion 302 may comprise a cost and account determination group generator 2002, a cost revenue element type generator 2004 and a cost revenue element generator 2006.

The cost and account determination group generator 2002 may receive information indicative of a type of material issued, e.g., portion 420 (FIG. 4) of information 400 (FIG. 4), and/or a type of service consumed, e.g., portion 440 (FIG. 4) of information 700 (FIG. 7), and may determine, based at least in part on such material or service, an account determination group associated with such material and/or service.

In some embodiments, the cost and account determination group generator 2002 may comprise a look-up table or other mapping that defines an association between types of materials and/or services and account determination groups. For example, if the account determination group converter 2002 comprises a look up table, a first address of the look up table may store a first account determination group associated with a first type of material. A second address of the look up table may store a second account determination group associated with a second type of material. And so on.

The cost and account determination group generator 2002 may further receive information indicative of the quantity of material issued, e.g., portion 422 (FIG. 4) of information 400 (FIG. 4), and/or the quantity of the service consumed, e.g., portion 442 (FIG. 4) of information 400 (FIG. 4), and may determine, based at least in part on such quantity of material and/or service, a cost and/or credit associated with such quantity of material and/or service.

In some embodiments, the cost and account determination group generator 2002 may comprise a look-up table or other mapping that defines a price associated with given quantities of materials and/or services. The cost and account determination group generator 2002 may determine the cost and/or credit associated with the quantity of material issued and/or service consumed by multiplying (i) the quantity of material issued and/or service consumed by (ii) the price of the material and/or service. In some embodiments, one or more of such look-up tables or other mappings may be defined by material master and/or service master database 1600 (FIG. 16).

The cost revenue element type generator 2004 may receive information indicative of a cost line item type and may determine, based at least in part on the cost line item type, a classification, sometimes referred to herein as a cost revenue element type, associated with such cost line item type.

In some embodiments, the cost revenue element type generator 2004 may comprise a look-up table or other mapping that defines an association between cost line item types and cost revenue element types. For example, if the cost revenue element type generator 2004 comprises a look up table, a first address of the look up table may store a first cost revenue element type associated with a first cost line item type. A second address of the look up table may store a second cost revenue element type associated with a second cost line item type. And so on.

The account determination group and the cost revenue element type may each be supplied to the cost revenue element generator 2006. The cost revenue element generator 2006 may determine, based at least in part on the account determination group and the cost revenue element type, a cost revenue element associated with the combination of such account determination group and cost line item type.

In some embodiments, the cost revenue element generator 2006 may comprise one or more look up tables or other mapping that may be used to define the cost revenue element based at least in part on the account determination group and cost revenue element type.

In accordance with some embodiments, the one or more look up tables or other mapping used to define the cost revenue element may be the same look up tables or other mapping used to by the GL account and cost revenue element generator 1506 (FIG. 15). In accordance with some embodiments, such look up tables or other mapping may be adapted to receive two inputs and generate one output. The look up tables or other mapping may generate the cost revenue element if supplied with the account determination group and the cost line item type.

Figure 21:
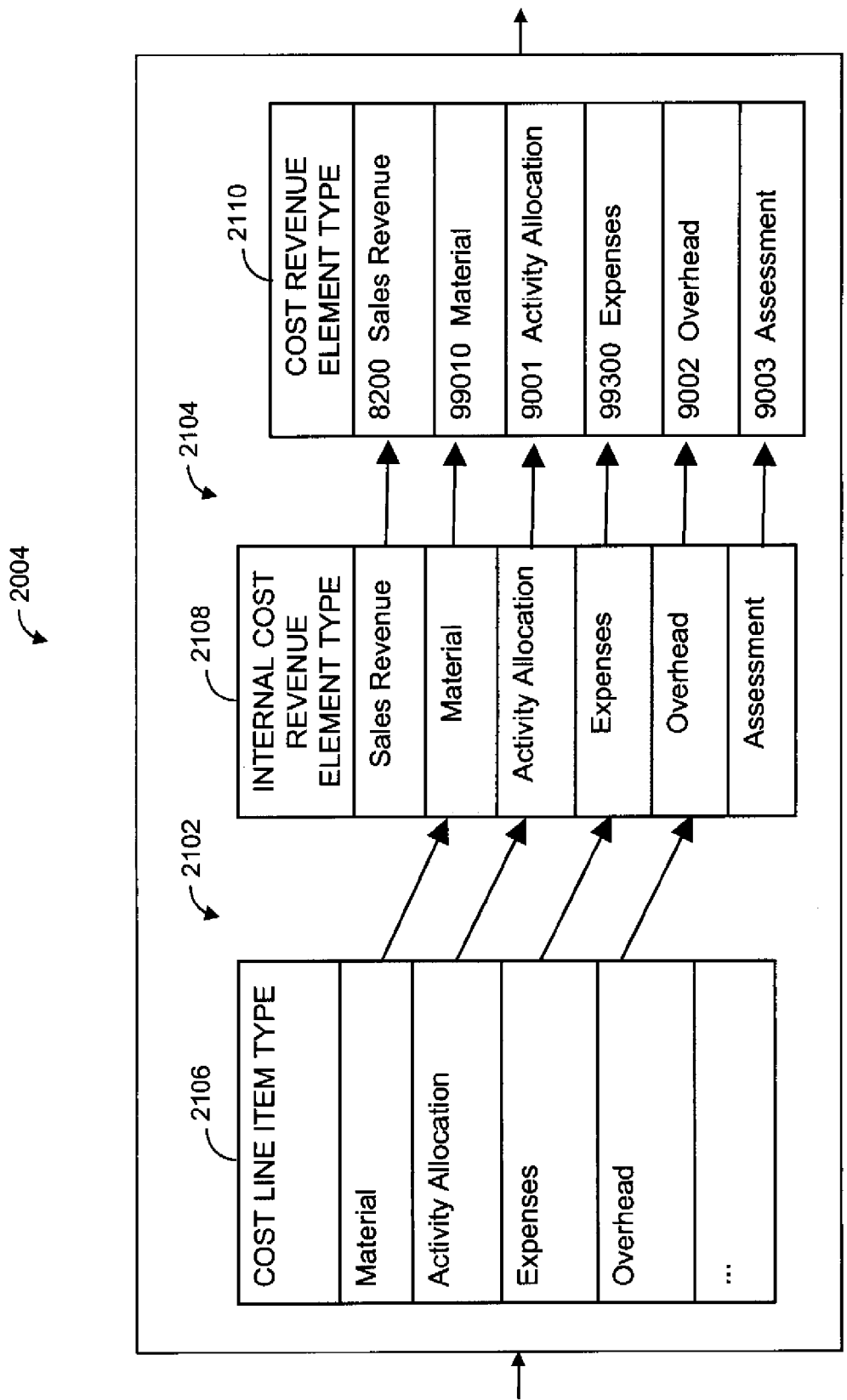
FIG. 21 is a functional block diagram of a portion of the financial system of the system of FIG. 1B, in accordance with some embodiments.

FIG. 21 is a schematic representation of a portion of the cost revenue element type generator 2004, in accordance with some embodiments. Referring to FIG. 21, in accordance with some embodiments, the portion of the cost revenue element type generator 2004 may comprise a mapping that defines an association between cost line item types and cost revenue element types.

In some embodiments, the mapping may comprise two mappings 2002-2004. A first mapping 2002 may define an association between cost line item types and internal cost revenue element types 2008. The second mapping 2004 may define an association between internal cost revenue element types 2008 and cost revenue element types 2010.

In some embodiments, the generator 1506 may be embodied in a procedure. The procedure may be defined to receive two input parameters and supply one output parameter. If the procedure is supplied with the account determination group and the GL type, the procedure may generate the GL account for the entry in the financial information. If the procedure is supplied with the account determination group and the cost revenue element type, the procedure may generate the cost revenue element for the entry in the financial information. The procedure may use the same mapping to generate the GL account and the cost revenue element.

The procedure may be embodied in software and/or firmware. The procedure may have any structure for example, but not limited to a subroutine, a subprogram and/or any other structure(s) or combinations thereof.

In some embodiments, the same procedure and mapping may also be used as the generator 2006 to generate the cost revenue element for the cost plan. That is, if the procedure is supplied with the account determination group and cost revenue element type, the procedure may generate the cost revenue element for the entry in the cost plan.

In accordance with some embodiments, the system may provide the report 312 with no additional work and/or only a minimal amount of additional work on the part of the user. In some embodiments, for example if a predefined mapping is used for the cost revenue element generator 2006 and the GL account and cost revenue generator 1506, the system may provide the report 312 with no additional work and/or only a minimal amount of additional work on the part of the user.

In accordance with some embodiments, the granularity of the report 312 may depend on the granularity provided by the cost revenue elements. FIG. 23 is a schematic representation of cost revenue elements that may be needed in order to generate a report 312 having the granularity illustrated in FIG. 9A, in accordance with some embodiments.

FIG. 24 is schematic representation of cost revenue elements that may be provided in another embodiment. FIG. 25 is schematic representation of a report 312 that may be generated by the financial analysis portion 306 (FIG. 3) in accordance with some embodiments, if the system includes only the cost revenue elements illustrated in FIG. 24. As can be seen, the cost revenue elements illustrated in FIG. 24 collectively provide less granularity than the cost revenue elements illustrated in FIG. 23. As a result, the embodiment of the report 312 illustrated in FIG. 25 has less granularity than the embodiment of the report 312 illustrated in FIG. 9A.

In some embodiments, the granularity is defined by the mapping defined provided by the GL account and cost revenue element generator 1506 and/or the cost revenue element generator 2006. In accordance with some embodiments, the system 100 may provide a predefined mapping for the GL account and cost revenue element generator 1506 and/or the cost revenue element generator 2006.

In accordance with some embodiments, the system may provide the user with the option to define and/or change the granularity of the cost revenue element. In some embodiments, this may be done via a user interface. In some embodiments, a user interface may comprise a graphical user interface.

FIG. 26 is a flow chart of a method 2600 according to some embodiments. In some embodiments, one or more portions of the method may be performed by the processing system 100. In some embodiments, one or more portions of the method may be used to define and/or change the mapping for the cost revenue element.

Referring to FIG. 26, at 2604, a user may access the system. At 2606, the user may be prompted (e.g., via a user interface) to enter a user identifier (e.g., name and password). If the user enters a user identifier, then at 2610, a determination is made as to whether the user identifier is valid. If the user identifier is valid, then at 2612 the user may be prompted to indicate a desired operation. If the user indicates a desire to change a mapping for the cost revenue element, then at 2614, the system may provide information (e.g., via a window on a display) that indicates a current mapping. In some embodiments, the information may have the form of the representation illustrated in FIG. 18. At 2616, the user may be prompted to indicate a portion of the mapping that is to be changed. In some embodiments, prompting the user may comprise prompting the user to select a table that includes the portion to be changed. If the user indicates such a portion, then at 2618, the system may prompt the user to indicate the desired change. If the user indicates a desired change, then at 2620, a determination may be made is made as to whether identified change is valid. If the indicated change is invalid, then at 2622, the user may be informed of such and may be prompted to indicate whether another change is desired. If another change is desired, execution may return to 2618. If at 2620, the indicated change is valid, then at 2624, the requested change may be performed and the user may be prompted to indicate whether another change is desired. If another change is desired, execution may return to 2618. If another change is not desired, then execution may return to 2612 and the user may be prompted to indicate a desired operation.

Some embodiments may include: (i) defining a descriptor for the use of cost analysis in an electronic financial accounting data processing system, and/or (ii) defining categories, granularity, and/or level on which a cost analysis should be done. In some embodiments, the descriptor may be the only characteristic used in a cost analysis covering one, some and/or all areas of accounting. Such areas of accounting may preferably include actual costs, cost planning, and profitability analysis and profitability planning. In some embodiments, the descriptor may be the only characteristic used in a cost analysis covering one, some or all types of cost objects. Such types of cost objects may comprise projects, manufacturing orders and/or sales orders. In some embodiments, a cost analysis may have a granularity defined by a mapping that defining the descriptor. In some embodiments, the mapping may be defined in accordance with special requirements, if any, that may exist in regard to a desired cost analysis. In some embodiments, the mapping may be defined automatically, i.e., with no effort and/or with only minimal effort on the part of the user.

FIG. 22 is a block diagram of an apparatus 2200 according to some embodiments. In some embodiments, one or more of the systems (or portion(s) thereof) disclosed herein may have an architecture that is the same as and/or similar to the architecture of apparatus 2200.

Referring to FIG. 22, in accordance with some embodiments, the apparatus 2200 includes a processor 2201 operatively coupled to a communication device 2202, an input device 2203, an output device 2204 and a storage device 2206.

In some embodiments, the processor 2201 may execute processor-executable program code to provide one or more portions of the one or more functions disclosed herein and/or to carry out one or more portions of one or more embodiments of one or more methods disclosed herein. In some embodiments, the processor 2201 may be a conventional microprocessor or microprocessors.

The communication device 2202 may be used to facilitate communication with other devices and/or systems. In some embodiments, communication device 2202 may be configured with hardware suitable to physically interface with one or more external devices and/or network connections. For example, communication device 2202 may comprise an Ethernet connection to a local area network through which apparatus 2200 may receive and transmit information over the Web.

The input device 2203 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 2204 may comprise, for example, one or more devices used to output data and/or other information, such as, for example: an IR port, a docking station, a display, a speaker, and/or a printer, etc.

However, information may be received from any source(s). In some embodiments, the information may be received from one or more sources within the apparatus 2200. In some embodiments, information may be received via the communication device 2202. In some embodiments, information may be received from the storage device 2206. In some embodiments, information may be supplied via a user interface. In some embodiments, a user interface may comprise a graphical user interface. In some embodiments, the information may be received from one or more sources outside the apparatus 2200. In some embodiments, the information may be received from one or more sources within the apparatus and one or more sources outside the apparatus 2200. In some embodiments, information may be received from one or more sources in lieu of and/or in addition to one or more of the sources described herein.

The storage device 2206 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 2206 may store one or more programs 2210-2212, which may include one or more instructions to be executed by the processor 2201 to perform one or more portions of one or more embodiments of one or more financial programs and/or one or more portions of one or more embodiments of one or more methods disclosed herein.

One or more of the one or more programs 2210-2212 may include one or more criteria that may be used in carrying out one or more portions of one or more embodiments of one or more financial programs and/or one or more portions of one or more embodiments of one or more methods disclosed herein.

In some embodiments, the one or more programs may include one or more operating systems, database management systems, other applications, other information files, etc., for operation of the apparatus 100.

The storage device 2206 may store one or more databases 2214-2216, which may include a master data database, a general ledger and/or one or more sub ledgers, a document database, and/or criteria for one or more financial programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more of the databases may be used in carrying out one or more portions of one or more functions disclosed herein and/or to carry out one or more portions of one or more embodiments of one or more methods disclosed herein.

Other programs and/or databases may also be employed.

In some embodiments, one or more portions of one or more embodiments disclosed herein may be embodied in a method, an apparatus, a computer program product, and/or a storage medium readable by a processing system.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

While various embodiments have been described, such description should not be interpreted in a limiting sense. It is to be understood that other embodiments may be practiced without departing from the spirit and scope of the invention, as recited in the claims appended hereto.

What is claimed is:

1. A method comprising:
generating, by a processor, entries for at least one cost plan that includes planned amounts, each of the entries including a planned amount and a descriptor; and
generating, by a processor, postings for an accounting document, each of the postings including an actual amount and a descriptor;
wherein generating postings for the accounting document comprises:
receiving first information;
generating a classification for one of the postings based at least in part on the first information and a first mapping;
generating the descriptor for the one of the postings based at least in part on the classification and a second mapping; and
wherein generating entries for the at least one cost plan that includes planned amounts comprises:
receiving second information;
generating a classification for one of the entries for the at least one cost plan that includes planned amounts based at least in part on the second information and a third mapping, wherein the third mapping is different than the first mapping; and
generating the descriptor for the one of the entries for the at least one cost plan that includes planned amounts based at least in part on the second mapping and the classification for the one of the entries;
wherein the descriptor for the one of the entries for the at least one cost plan that includes planned amounts is the same as the descriptor for the one of the postings for the accounting document.

2. The method of claim 1, wherein the descriptor for the one of the entries comprises a numeric portion that identifies a general ledger account.

3. The method of claim 2, wherein the descriptor for the one of the entries further comprises a non numeric portion that identifies the general ledger account.

4. The method of claim 1, wherein the descriptor for the one of the postings comprises a numeric portion that identifies the general ledger account.

5. The method of claim 1, further comprising:
associating a subset of the entries for the at least one cost plan with a subset of the postings for the accounting document based at least in part on (i) the descriptor of each entry of the subset of the entries and (ii) the descriptor of each posting of the subset of the postings.

6. The method of claim 5, wherein the descriptor of each entry of the subset of the entries is the same.

7. The method of claim 6, wherein the descriptor of each posting of the subset of the postings is the same.

8. The method of claim 7, wherein the descriptor of each posting of the subset of the postings is the same as the descriptor of each entry of the subset of the entries.

9. The method of claim 5, wherein the descriptor of each entry of the subset of the entries comprises a cost revenue element and the descriptor of each posting of the subset of the postings comprises the first cost revenue element.

10. The method of claim 5, wherein the accounting document comprises a general ledger.

11. The method of claim 5, further comprising:
determining a sum of the planned amounts of all entries of the subset of the entries; and
determining a sum of the actual amounts of all postings of the subset of the postings.

12. The method of claim 11, further comprising:
comparing the sum of the actual amounts and the sum of the planned amounts.

13. The method of claim 11, further comprising:
generating a report associating the sum of the actual amounts and the sum of the planned amounts.

14. The method of claim 13 further comprising displaying the report on a display.

15. The method of claim 5, further comprising:
associating a second subset of the entries for the at least one cost plan with a second subset of the postings for the accounting document based at least in part on (i) the descriptor of each entry of the second subset of the entries and (ii) the descriptor of each posting of the second subset of the postings.

16. The method of claim 15, further comprising:
determining a sum of the planned amounts of all entries of the second subset of the entries; and
determining a sum of the actual amounts of all postings of the second subset of the postings.

17. The method of claim 16, further comprising:
comparing the sum of the actual amounts of all postings of the second-subset of the postings and the sum of the planned amounts of all entries of the second subset of the entries.

18. The method of claim 16, further comprising:
generating a report associating the sum of the actual amounts of all postings of the second subset of the postings and the sum of the planned amounts of all entries of the second subset of the entries.

19. The method of claim 1, wherein the classification for the one of the postings is equal to a first classification if the first information is equal to a first description, and wherein the classification for the one of the postings is equal to the first classification if the first information is equal to a second description.

20. The method of claim 1 wherein the first information comprises a business transaction type.

21. The method of claim 20 wherein the classification for the one of the postings is a cost revenue element type.

22. The method of claim 1 wherein the second information comprises a cost line item type.

23. The method of claim 22 wherein the classification for the one of the entries is a cost revenue element type.

24. The method of claim 1 further comprising displaying the descriptor for one of the entries on a display.

25. The method of claim 1, wherein generating each one of the postings for the accounting document comprises:
- generating a classification for the one of the postings based at least in part on the first information and the first mapping; and
- generating the descriptor for the one of the postings based at least in part on the classification and the second mapping; and
- wherein generating each one of the entries for the at least one cost plan that includes planned amounts comprises:
- generating a classification for the one of the entries for the at least one cost plan that includes planned amounts based at least in part on the second information and the third mapping; and
- generating the descriptor for the one of the entries for the at least one cost plan that includes planned amounts based at least in part on the second mapping and the classification for the one of the entries.

26. Apparatus comprising:
a processing system comprising:
at least one processor to:
- generate entries for at least one cost plan, each of the entries including a planned amount and a descriptor; and
- generate postings for an accounting document, each of the postings including an actual amount and a descriptor;
- wherein the at least one processor to generate entries and generate postings comprises at least one processor to:
  - receive first information;
  - generate a classification for one of the postings based at least in part on the first information and a first mapping;
  - generate the descriptor for the one of the postings based at least in part on the classification and a second mapping;
  - receive second information;
  - generate a classification for one of the entries based at least in part on the second information and a third mapping, wherein the third mapping is different than the first mapping; and
  - generate the descriptor for the one of the entries based at least in part on the second mapping and the classification for the one of the entries;
  - wherein the descriptor for the one of the entries is the same as the descriptor for the one of the postings.

27. Apparatus comprising:
means for generating entries for at least one cost plan, each of the entries including a planned amount and a descriptor; and
means for generating postings for an accounting document, each of the postings including an actual amount, and a descriptor;
wherein the means for generating postings comprises:
- means for receiving first information;
- means for generating a classification for one of the postings based at least in part on the first information and a first mapping;
- means for generating the descriptor for the one of the postings based at least in part on the classification and a second mapping; and
wherein the means for generating entries for the at least one cost plan comprises:
- means for receiving second information;
- means for generating a classification for one of the entries based at least in part on the second information and a third mapping, wherein the third mapping is different than the first mapping; and
- means for generating the descriptor for the one of the entries based at least in part on the second mapping and the classification for the one of the entries;
- wherein the descriptor for the one of the entries is the same as the descriptor for the one of the postings.

28. A computer program product comprising:
a storage medium having instructions stored thereon, the instructions being executable by a machine to result in the following:
- generating entries for at least one cost plan, each of the entries including a planned amount and a descriptor; and
- generating postings for an accounting document, each of the postings including an actual amount and a descriptor;
- wherein generating postings for the accounting document comprises:
  - receiving first information;
  - generating a classification for one of the postings based at least in part on the first information and a first mapping;
  - generating the descriptor for the one of the postings based at least in part on the classification and a second mapping; and
- wherein generating entries for the at least one cost plan comprises:
  - receiving second information;
  - generating a classification for one of the entries based at least in part on the second information and a third mapping, wherein the third mapping is different than the first mapping; and
  - generating the descriptor for the one of the entries based at least in part on the second mapping and the classification for the one of the entries;
  - wherein the descriptor for the one of the entries is the same as the descriptor for the one of the postings.

29. A storage medium readable by a machine and having instructions stored thereon, the instructions being executable by the machine to result in the following:
- generating entries for at least one cost plan, each of the entries including a planned amount and a descriptor;
- generating postings for an accounting document, each of the postings including an actual amount and a descriptor;
- wherein generating postings for the accounting document comprises:
  - receiving first information;
  - generating a classification for one of the postings based at least in part on the first information and a first mapping;
  - generating the descriptor for the one of the postings based at least in part on the classification and a second mapping; and
- wherein generating entries for the at least one cost plan comprises:
  - receiving second information;
  - generating a classification for one of the entries based at least in part on the second information and a third mapping, wherein the third mapping is different than the first mapping; and
  - generating the descriptor for the one of the entries based at least in part on the second mapping and the classification for the one of the entries;
  - wherein the descriptor for the one of the entries is the same as the descriptor for the one of the postings.

30. Apparatus comprising:
a storage medium having instructions stored thereon:
a processor in communication with the storage medium and operative in conjunction with the instructions to:

generate entries for at least one cost plan, each of the entries including a planned amount and a descriptor; and generate postings for an accounting document, each of the postings including an actual amount and a descriptor;

wherein the processor to generate entries and generate postings comprises a processor to:

receive first information;

generate a classification for one of the postings based at least in part on the first information and a first mapping;

generate the descriptor for the one of the postings based at least in part on the classification and a second mapping;

receive second information;

generate a classification for one of the entries based at least in part on the second information and a third mapping, wherein the third mapping is different than the first mapping; and generate the descriptor for the one of the entries based at least in part on the second mapping and the classification for the one of the entries;

wherein the descriptor for the one of the entries is the same as the descriptor for the one of the postings.

* * * * *